US006804755B2

(12) United States Patent
Selkirk et al.

(10) Patent No.: US 6,804,755 B2
(45) Date of Patent: Oct. 12, 2004

(54) APPARATUS AND METHOD FOR PERFORMING AN INSTANT COPY OF DATA BASED ON A DYNAMICALLY CHANGEABLE VIRTUAL MAPPING SCHEME

(75) Inventors: Stephen S. Selkirk, Broomfield, CO (US); Charles A. Milligan, Golden, CO (US)

(73) Assignee: Storage Technology Corporation, Louisville, CO (US)

(*) Notice: Subject to any disclaimer, the term of this patent is extended or adjusted under 35 U.S.C. 154(b) by 303 days.

(21) Appl. No.: 09/884,294

(22) Filed: Jun. 19, 2001

(65) Prior Publication Data

US 2002/0178335 A1 Nov. 28, 2002

Related U.S. Application Data

(60) Provisional application No. 60/212,260, filed on Jun. 19, 2000.

(51) Int. Cl.[7] .......................... G06F 13/00; G06F 12/16
(52) U.S. Cl. ..................... 711/165; 711/162; 711/202
(58) Field of Search ............................ 711/114, 162, 711/165, 202; 714/6

(56) References Cited

U.S. PATENT DOCUMENTS

| 6,029,166 A | 2/2000 | Mutalik et al. ............ 707/3 |
|---|---|---|
| 6,038,639 A | 3/2000 | O'Brien et al. ............ 711/114 |
| 6,058,054 A * | 5/2000 | Islam et al. ............... 365/200 |
| 6,078,932 A * | 6/2000 | Haye et al. ................ 707/204 |
| 6,161,111 A | 12/2000 | Mutalik et al. ............ 707/205 |
| 6,212,531 B1 | 4/2001 | Blea et al. ................. 707/204 |

FOREIGN PATENT DOCUMENTS

| WO | 9848347 | * 10/1998 |
|---|---|---|
| WO | 9913403 | * 3/1999 |

* cited by examiner

Primary Examiner—Glenn Gossage
(74) Attorney, Agent, or Firm—Yee & Associates P.C.

(57) ABSTRACT

A method, apparatus and computer program product for performing an instant copy of data are provided to support dynamically changeable virtual mapping schemes in a data processing system. The present invention separates processing of data unit requirements from the selection of which storage subsystems to use for storage by using a storage methodologies inventory. Various instant copy mechanisms are provided for copying data upon receiving a write operation to either original or copy data. The instant copy mechanisms may be selected based on the type of mapping originally used to store the data that is to be copied. Determining the mapping of the data may include parsing extents of the data into sets based on types of mapping used to map extents. The mapping of the data may be one of load point and offset, and a full pointer mapping.

61 Claims, 19 Drawing Sheets

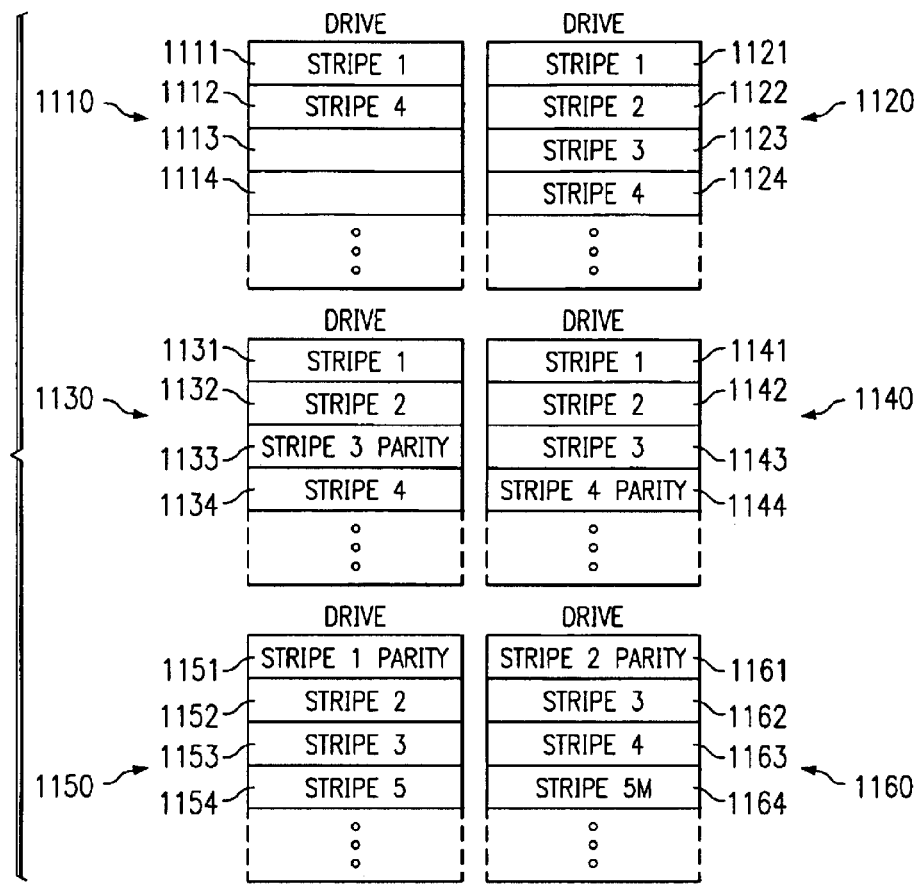
FIG. 11
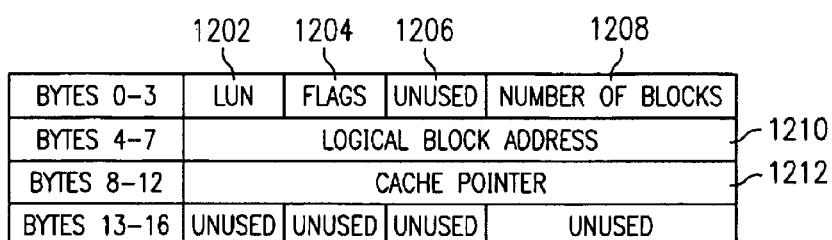
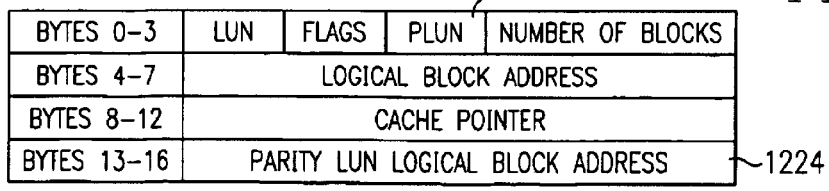
FIG. 12

| TIMESTAMP | | | |
|---|---|---|---|
| LBA OF PREVIOUS STRIPE | | | |
| PREVIOUS STRIPE LUN | INDEX OF PARITY DRIVE | RAID TYPE OF STRIPE | NUMBER OF STRIPS IN STRIPE |
| STRIP SIZE IN BLOCKS | | | |
| | | | |
| FIRST LUN IN STRIPE | ACTIVE COUNT | NUMBER OF HOST PIECES IN STRIP | UNUSED |
| LBA OF DATA ON FIRST LUN | | | |
| SECOND LUN IN STRIPE | ACTIVE COUNT | NUMBER OF HOST PIECES IN STRIP | UNUSED |
| LBA OF DATA ON SECOND LUN | | | |
| Nth LUN IN STRIPE | ACTIVE COUNT | NUMBER OF HOST PIECES IN STRIP | UNUSED |
| LBA OF DATA ON Nth LUN | | | |
| | | | |
| HOST LUN | LENGTH IN STRIP | HOST LENGTH | |
| HOST LBA | | | |
| | | | |
| HOST LUN | LENGTH IN STRIP | HOST LENGTH | |
| HOST LBA | | | |

*FIG. 13*

APPARATUS AND METHOD FOR PERFORMING AN INSTANT COPY OF DATA BASED ON A DYNAMICALLY CHANGEABLE VIRTUAL MAPPING SCHEME

CROSS REFERENCE TO RELATED APPLICATIONS

This application claims the benefit of the filing date of corresponding U.S. Provisional Patent Application No. 60/212,260, entitled SYSTEM FOR PROVIDING AN ARBITRARY NUMBER OF ON DEMAND, UNIQUE COPIES OF DATA UTILIZING MINIMUM STORAGE, filed Jun. 19, 2000.

In addition, the present invention is related to applications entitled A SYSTEM TO SUPPORT DYNAMICALLY FLEXIBLE DATA DEFINITIONS AND STORAGE REQUIREMENTS, Ser. No. 09/751,635, filed on Dec. 29, 2000; USING CURRENT RECOVERY MECHANISMS TO IMPLEMENT DYNAMIC MAPPING OPERATIONS, Ser. No. 09/800,714, filed on Mar. 8, 2001, now U.S. Pat. No. 6,532,527; RECOVERY OF DYNAMIC MAPS AND DATA MANAGED THEREBY, Ser. No. 09/752,253, filed on Dec. 30, 2000; FLOATING VIRTUALIZATION LAYERS, Ser. No. 09/752,071, filed on Dec. 29, 2000; SELF DEFINING DATA UNITS, Ser. No. 09/751,641, filed on Dec. 29, 2000; DYNAMICALLY CHANGEABLE VIRTUAL MAPPING SCHEME, Ser. No. 09/751,772, filed on Dec. 29, 2000; APPARATUS AND METHOD FOR INSTANT COPY OF DATA, Ser. No. 09/884,822, and APPARATUS AND METHOD FOR INSTANT COPY OF DATA IN A DYNAMICALLY CHANGEABLE VIRTUAL MAPPING ENVIRONMENT, Ser. No. 09/884,687, both of which are filed on even date hereof. All of the above related applications are assigned to the same assignee, and are incorporated herein by referenced.

BACKGROUND OF THE INVENTION

1. Technical Field

The present invention relates generally to an improved data processing system and in particular to a data storage subsystem for use with a data processing system. Still more particularly, the present invention provides an apparatus and method for performing an instant copy of data based on a dynamically changeable virtual mapping scheme in a data processing system.

2. Description of Related Art

In computer systems and data storage subsystems, one problem is performing a data file copy operation in a manner that minimizes the use of processing resources and data storage memory. Previously, data files were copied in their entirety by the processor, such that two exact copies of the selected data file were resident in the data storage memory. This operation consumed twice the amount of memory for the storage of two identical copies of the data file. Additionally, this operation required the intervention of the processor to effect the copy of the original data file.

A data file snapshot copy is an improvement over this type of copy process. This snapshot copy process includes a dynamically mapped virtual data storage subsystem. This subsystem stores data files received from a processor in back-end data storage devices by mapping the processor assigned data file identifier to a logical address that identifies the physical storage location of the data. This dynamically mapped virtual data storage subsystem performs a copy of a data file by creating a duplicate data file pointer to a data file identifier in a mapping table to reference the original data file. In this dynamically mapped virtual data storage subsystem, the data files are referred to as a collection of "virtual tracks" and each data file is identified by unique virtual track addresses (VTAs). The use of a mapping table provides the opportunity to replace the process of copying the entirety of a data file in the data storage devices with a process that manipulates the contents of the mapping table. A data file appears to have been copied if the name used to identify the original data file and the name used to identify the copy data file are both mapped to the same physical data storage location.

This mechanism enables the processor to access the data file via two virtual track addresses while only a single physical copy of the data file resides on the back-end data storage devices in the data storage subsystem. This process minimizes the time required to execute the copy operation and the amount of memory used since the copy operation is carried out by creating a new pointer to the original data file and does not require any copying of the data file itself.

One implementation of the snapshot copy process provides a two-table approach. One table has table entries for each virtual device track pointing to another table containing the physical track location for the entry. Each physical track table entry identifies the number of virtual track entries that point to this entry by use of a reference count mechanism. Each virtual track entry that points to the physical track is called a "reference." The reference count increments when a new virtual track table entry pointer points to this physical entry (e.g. snap) and the reference count decrements when a virtual track table entry pointer is removed (e.g. update source after a snap). When a reference count is zero, then that physical track can be deleted from the back-end since it is known that there are no references to the physical track.

System administrators are beginning to realize that "point in time" or "instant" copies of data are extremely useful. However, the system administrator has to specifically plan for and request execution of these copies at the host level, such as setting up mirrored volumes or using the snapshot commands available in virtual mapping subsystems.

SUMMARY OF THE INVENTION

The present invention is directed to an apparatus and method to support dynamically changeable virtual mapping schemes in a data processing system. The processing of data unit requirements in the present invention is separated from the selection of which storage subsystems to use for storage by using a storage methodologies inventory. A stored data management subsystem contains one or more hosts. A plurality of data storage elements is functionally coupled to the one or more hosts. The plurality of data storage elements is organized using a plurality of layers of mapping tables. The plurality of layers of mapping tables provides unique identification of location of the data such that individual data entries in a mapping table is variable and self-defining with respect to the amount of data managed.

In addition, various instant copy mechanisms are provided for copying data upon receiving a write operation to either original or to copy data. The instant copy mechanisms may be selected based on the type of mapping originally used to store the data that is to be copied. Other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 is an exemplary illustration of FlexRAID in accordance with the preferred embodiment of the present invention;

FIG. 12 is an exemplary illustration of a control block entry format and modifications to the control block entry in accordance with a preferred embodiment of the present invention;

FIG. 13 is an exemplary meta-data block in accordance with a preferred embodiment of the present invention;

DETAILED DESCRIPTION OF THE PREFERRED EMBODIMENT

Figure 1:
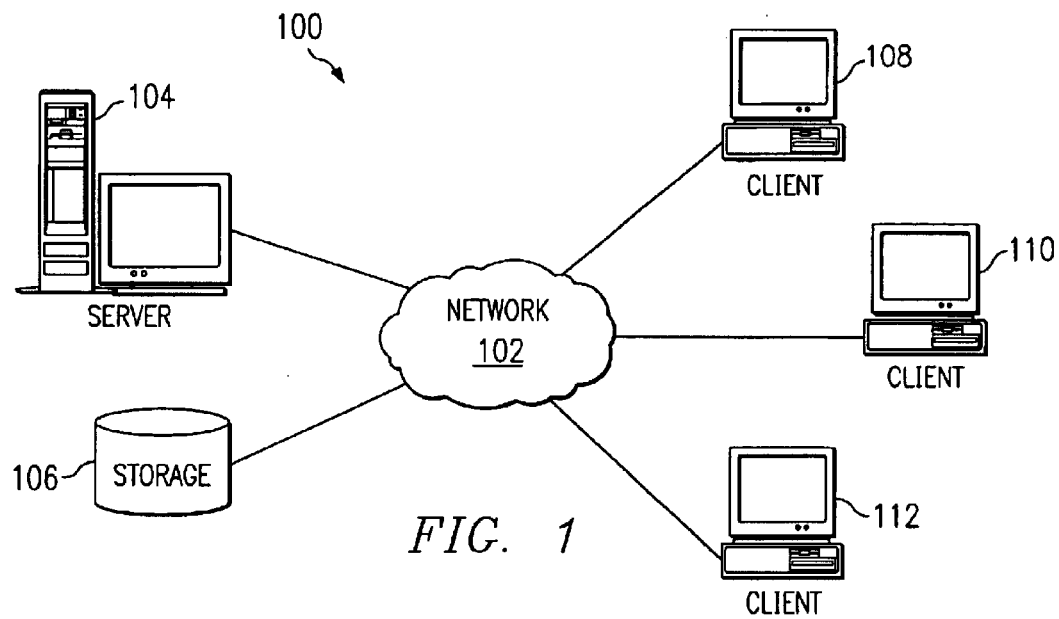
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage subsystem 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. Distributed data processing system 100 may be implemented as one or more of a number of different types of networks, such as, for example, an intranet, a local area network (LAN), or a wide area network (WAN). Network 102 contains various links, such as, for example, fiber optic links, packet switched communication links, enterprise systems connection (ESCON) fibers, small computer system interface (SCSI) cable, wireless communication links. In these examples, storage subsystem 106 may be connected to server 104 using ESCON fibers. FIG. 1 is intended as an example and not as an architectural limitation for the present invention.

Figure 2:
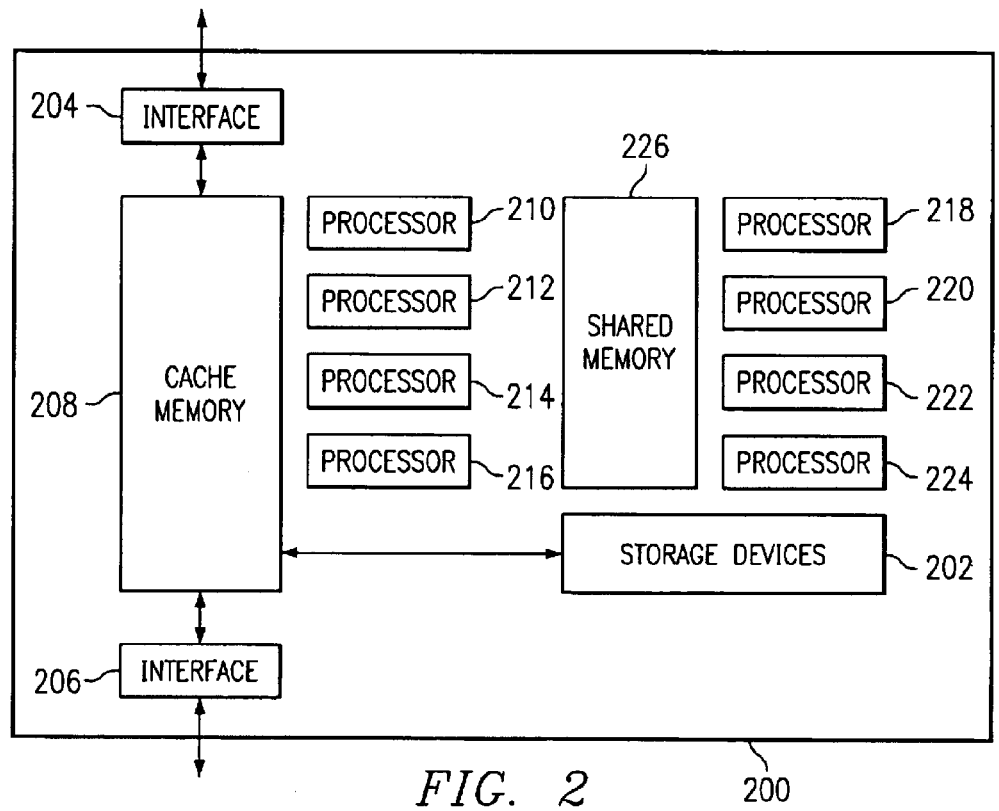
FIG. 2 is a block diagram of a storage subsystem in accordance with a preferred embodiment of the present invention.

Turning next to FIG. 2, a block diagram of a storage subsystem is depicted in accordance with a preferred embodiment of the present invention. Storage subsystem 200 may be used to implement storage subsystem 106 in FIG. 1. As illustrated in FIG. 2, storage subsystem 200 includes storage devices 202, interface 204, interface 206, cache memory 208, processors 210–224, and shared memory 226.

Interfaces 204 and 206 in storage subsystem 200 provide a communication gateway through which communication between a data processing system and storage subsystem 200 may occur. In this example, interfaces 204 and 206 may be implemented using a number of different mechanisms, such as ESCON cards, SCSI cards, fiber channel interfaces, modems, network interfaces, or a network hub. Although the depicted example illustrates the use of two interface units, any number of interface cards may be used depending on the implementation.

In this example, storage subsystem 200 is a shared virtual array. Storage subsystem 200 is a virtual storage system in that each physical storage device in storage subsystem 200 may be represented to a data processing system, such as client 108 in FIG. 1, as a number of virtual devices. In this example, storage devices 202 are a set of disk drives set up as a redundant array of independent disks (RAID) system. Of course, other storage devices may be used other than disk drives. For example, optical drives may be used within storage devices 202. Further, a mixture of different device types may be used, such as, disk drives and tape drives.

Data being transferred between interfaces 204 and 206 and storage devices 202 are temporarily placed into cache memory 208. Additionally, cache memory 208 may be accessed by processors 210–224, which are used to handle reading and writing data for storage devices 202. Shared memory 226 is used by processors 210–224 to handle and track the reading and writing of data to storage devices 202.

The present invention manages virtual storage facilities comprising an organization of computer equipment, for example, a host network, data transfer devices, storage controller devices, permanent storage devices and attachment devices connecting these devices together. The data storage facilities also may include management information associated with data units such that the management information provides an inventory of capabilities with upper and lower boundaries that may limit the options available to store the data and still meet a user's criteria. For purposes of this application, a data unit is a logical entity known to an owning entity that is composed of a number of data elements and meta-data, and a data element is a grouping of data bits or bytes that the subsystem chooses to manage as a consistent set. Such management information may be independent of attributes of or characteristics of the devices in the physical storage subsystem actually used to store the data elements, but may consist of imputed associations with those attributes through, for example, changeable rule sets, processes or algorithms. These rule sets, processes or algorithms may be changed by user demand or via processes, that may monitor data unit usage and manipulation. The storage of data elements may be adjusted to comply with modifications in, for example, the rules sets, processes or algorithms.

In addition, the present invention may include such management information processing with respect to storage device attributes which may include, for example, empirically derived relationships that may infer boundaries, explicitly stated relationships that may stipulate boundaries, relationships that may exist only on demand and combinations of standard storage subsystem relationships such as, for example, RAID in all its forms and hierarchical storage management (HSM) in all its forms. Also, relation of the management information and the subsystem device attributes may be modified resulting in the storage of the data units having to be adjusted in which such a change of relations between the management information and the subsystem attributes include encapsulated logic.

The relation between the management information and the subsystem device attributes may also include attributes of implied storage devices not present in the physical subsystem. The relation between the management information and the subsystem device attributes may also include apparently mutual exclusive sets of criteria, for example, criteria satisfied by multiple instances of data storage and criteria satisfied by storage of data at multiple layers on the storage subsystem. The relation between the management information and the subsystem device attributes may also be conditionally applied, such as, for example, between a specified criteria and a default criteria and between a plurality of specified criteria.

Figure 3:
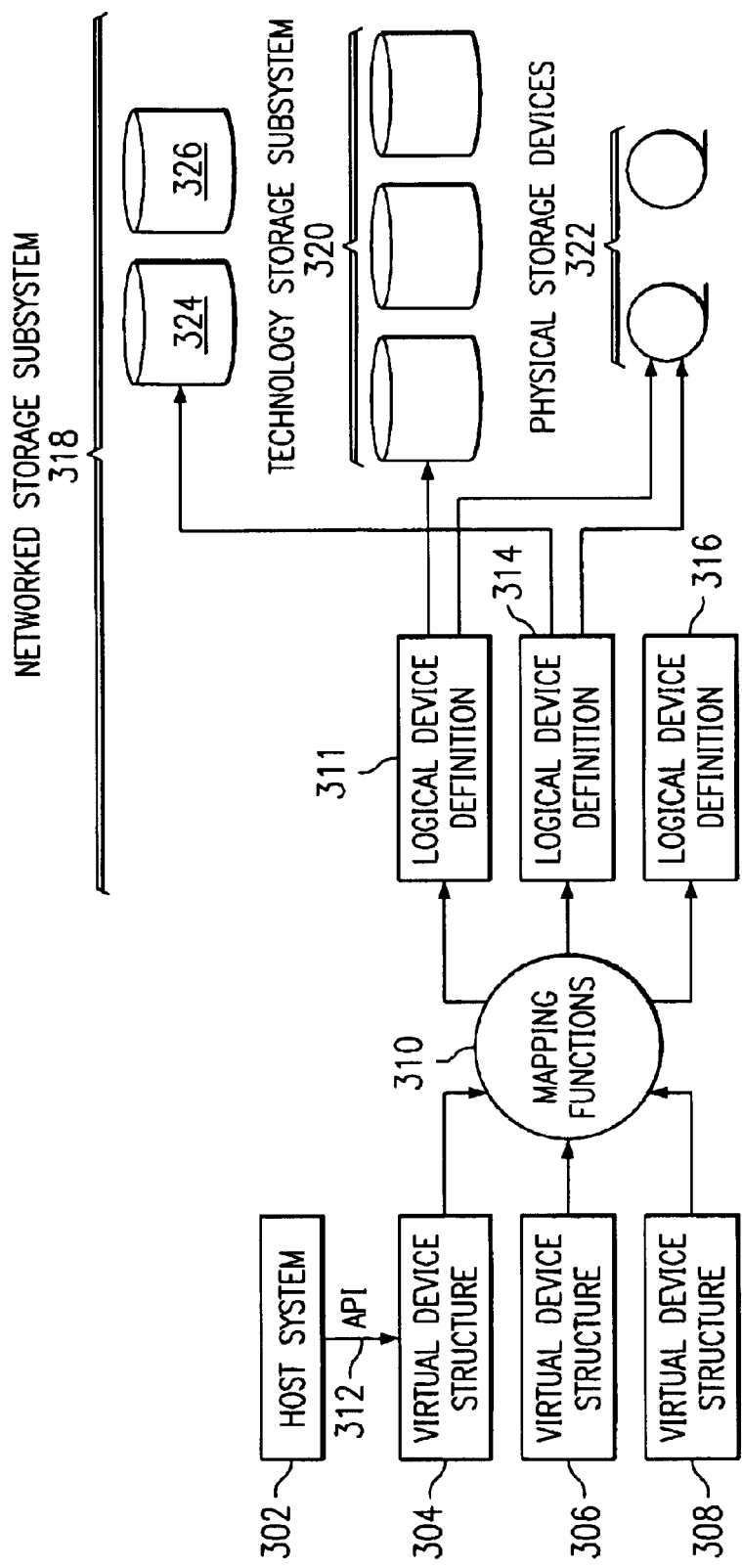
FIG. 3 is an exemplary block diagram of the conceptual relationship between the virtual device structures and the logical device structures in accordance with a preferred embodiment of the present invention.

FIG. 3 is an exemplary block diagram of the conceptual relationship between the virtual device structures and the logical device structures in accordance with a preferred embodiment of the present invention. A subsystem level application program interface (API) 312 is provided from host system 302 which allows a user to construct data unit definitions or virtual devices. These data unit definitions or virtual devices, such as, for example, virtual device structures 304, 306 and 308, may be called "Virtual Device Structures" (VDS). A subsystem in turn will implement logical device structures with mapping functions 310 and mapping VDSs into the physical world managed by the subsystem. The data may be mapped into networked storage subsystem 318 which may consist of logical device definitions 311, 314 and 316. Networked storage subsystem 318 may also consist of storage units 324 and 326 in which the data is stored. Also, data may be stored in technology storage subsystem 320 which may be a RAID and in physical storage devices 322.

VDSs may be defined by requesting the use of performance structures like striping, redundancy structures like mirroring and demand copies, and location structures like remote location of copies or archive copies, either alone or in combination. These VDSs also may have scheduling and synchronizing information that allow complete policies to be defined within the structure. Multiple technology selections may also be used, for example, disk and tape in the same virtual device structure. The ability to modify structure rules and the ability to adjust already stored data to the new rules is also provided.

A VDS may include a subsystem virtual device definition table which may consist of, for example, the following:
Virtual Definition 1:
  Performance Requirements:
  a) sustainable data transfer rate
  b) sustainable start input output (SIO) commands per second
  c) parallel SIO
  Availability Requirements
  a) time to first accessibility of data
  b) time to hold off new users for consistency checks
  Reliability Requirements
  a) allowed probability of data block loss
  b) allowed probability of data file loss Capacity Management Requirements a) maximum size of data unit The definition of Performance requirements, Availability requirements, Reliability requirements and Capacity Management requirements (PARC) for each data unit is available to the owning entity to interpret and to modify the entity. The owning entity may:

1) share access to the data definition with or without the data;
2) allow the data definition to be associated with the data;
3) allow the data definition to be distributed with the data; and
4) make a copy of the definition and have more than one definition for the same data unit, wherein
   a) the copy process may modify one or more of the extant definitions and expect the subsystem to make the necessary changes so that the data unit will comply with all definitions;
   b) the copy process may distribute data units or portions thereof with selected definitions; and
   c) the copy process may distribute data units or portions thereof with selected subsets of the full definition.

Storage performance, availability, reliability and capacity systems (PARCs) are dynamic subsystems that support flexible definitions of data storage requirements at the data level. The present invention is based on providing a subsystem level application program interface (API) that allows a user to request or imply a demand for the use of data storage capabilities. Such data storage capabilities may be defined by requesting capabilities associated with data units that may invoke the use of performance structures like, for example, striping, redundancy structures like mirroring and demand copies, and location or availability structures like, for example, remote location of copies or tape archives copies. These capabilities may also have scheduling and synchronizing information that may allow complete policies to be defined and associated with individual data units or sets of data units.

Therefore, the present invention anticipates future requirements by matching the definition associated with a data unit to a logical device definition with expanded capabilities, for example, using multiple sets of stripe groups to effect the availability of providing at a later date the performance of wider stripes than originally implied by the performance requested, using more layers or copies of redundancy data to later provide the ability to improve the reliability when specifications change and become higher than originally required, and actually making additional copies of the data on devices that employ different technologies possibly even in remote locations.

Figure 4:
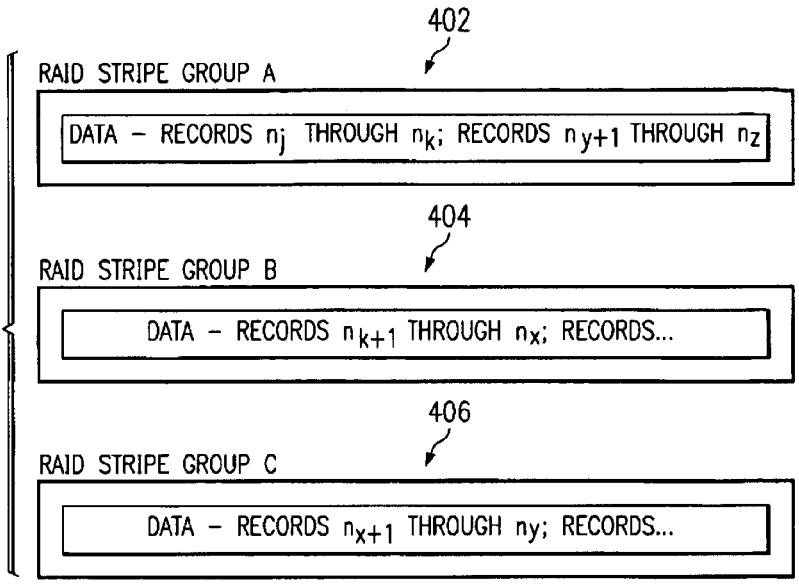
FIG. 4 is an illustration of the use of multiple RAID groups for providing potential for future higher performance requests in accordance with a preferred embodiment of the present invention.

FIG. 4 is an illustration of the use of multiple RAID groups for providing potential for future higher performance requests in accordance with a preferred embodiment of the present invention. FIG. 4 shows the use of multiple RAID groups where data may be read in parallel for records $n_j$ through $n_k$ from RAID stripe group A 402 and then records $n_{k+1}$ through $n_x$ may be read in parallel from RAID stripe group B 404 and then records $n_{x+1}$ through $n_y$ may be read in parallel from RAID stripe group C 406 and then cycling back to RAID stripe group A 402 for the next set of records $n_{y+1}$ through $n_z$. Later if performance requirements demand higher throughput records $n_j$ through $n_x$ may be read in parallel from RAID stripe group A 402 and RAID stripe group B 404 simultaneously or records $n_j$ through $n_y$ from RAID stripe group A 402, RAID stripe group B 404, and RAID stripe group C 406 simultaneously.

All RAID stripe groups may be read at once up to the point of anticipated performance requirements. If all RAID stripe groups are read at once, but the system does not meet a newly imposed performance requirement, then the data may be rewritten to a higher performance capability. The present invention also provides a facility for reviewing and modifying or adjusting the interpretation of "appropriate" data storage characteristics after the data element has already been stored. The specific way in which the host systems use the data will imply additional requirements initially not specified. These new requirements may be added to the overall specification and the implementation changed to accommodate the changes.

For example, the characteristics for a data unit may be historically maintained in a meta-data record associated with that data unit and may be updated as the use of the data is monitored. Updates may then trigger subsystem activity to modify the stored characteristics for the data unit. For example, the subsystem may note that a specific portion of the data is referenced in concert with another portion and as a consequence will set staging control meta-data that will fetch the anticipated data when the companion data is accessed. In addition, a facility for accepting new specifications for data storage characteristics after the data unit has been stored is provided. The ability for modifying where and/or how an already stored data unit is managed is provided, including, but not limited to the subsystem actually changing where and/or how the associated data elements are stored. The modification of data element storage may be required to meet newly interpreted or specified data unit storage characteristics. When new requirements are imposed on a set of data units and the system has not anticipated the requirements, the present invention builds a new logical device definition from the specified or interpreted data storage characteristics.

Figure 5:
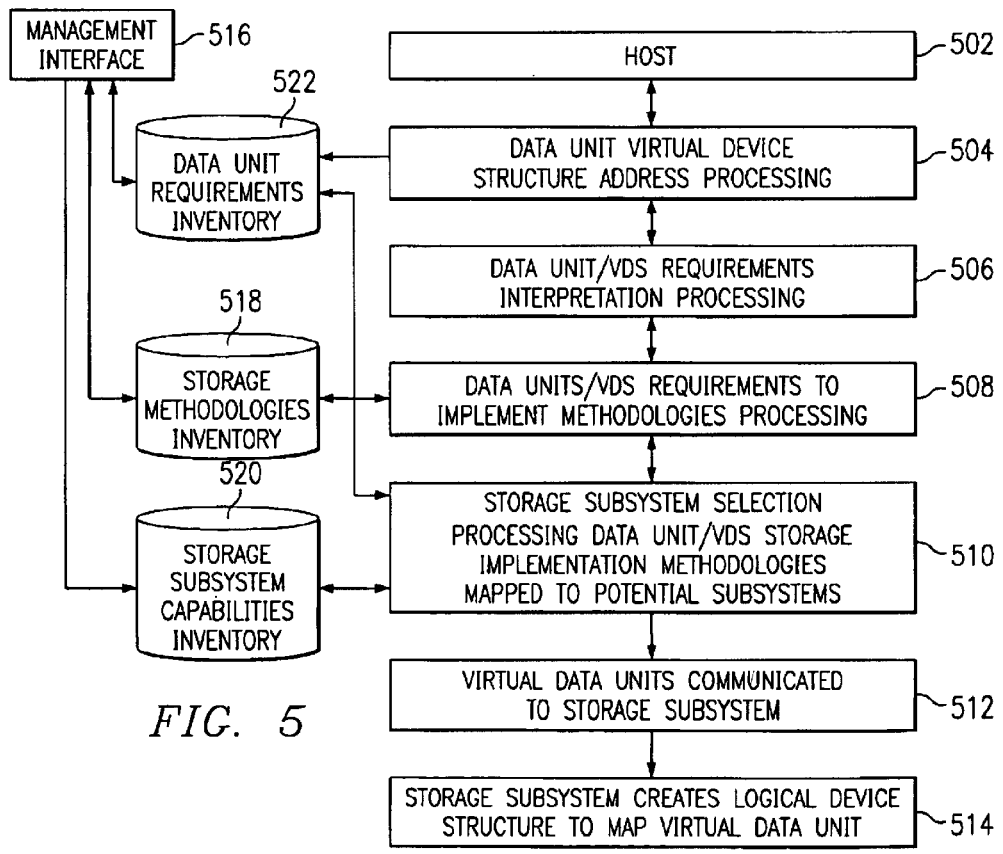
FIG. 5 is a flowchart illustrating a data unit/virtual device structure data processing methodology in accordance with a preferred embodiment of the present invention.

FIG. 5 is a flowchart illustrating a data unit/virtual device structure data processing methodology in accordance with a preferred embodiment of the present invention. A top down approach may be used by building towards characteristics of known physical device types. For a collection of data elements with a virtual data unit address understood by host system (502) the data unit virtual device structure address is processed (block 504). The assigned virtual address communicated to the subsystem may be the same as or different from the virtual data unit address that is known to the host system. The data unit/VDS requirements interpretation is processed (block 506), then the data unit/VDS requirements are processed to map methodologies for implementation (block 508). Then the storage subsystem selection processing for the data unit/VDS identifies which storage implementation methodologies are mapped to which potential subsystems, and selections for subsystem use are made (block 510). Virtual data units are then communicated to the storage subsystem or subsystems (block 512). Each storage subsystem creates a logical device structure to map the virtual data unit (block 514).

Management interface 516 may manage data unit requirements inventory 522, storage methodologies inventory 518 and receives and provides input from/to storage subsystem capabilities inventory 520. Data unit requirements inventory receives input from data unit virtual device structure address processing (block 504) and storage subsystem selection in processing data unit/VDS storage implementation methodologies when such methodologies are mapped to potential subsystems (block 510). Storage methodologies inventory 518 receives input from data unit/VDS and provides input to data unit/VDS requirements to map methodologies for implementation processing (block 508).

With storage virtualization, a host server is freed from the restrictions of actual storage mechanisms. Furthermore, an actual storage mechanism is freed from the restrictions of the presentation to the host server. Data storage is presented to the host server as an emulation of some device or media type or model. The data may actually be stored on one or more different types of devices and/or media. While storage management is concerned with physical characteristics of storage systems, devices and media, storage virtualization is concerned with masking the physical characteristics of storage systems and taking control of these physical characteristics from the user or system administrator.

Figure 6:
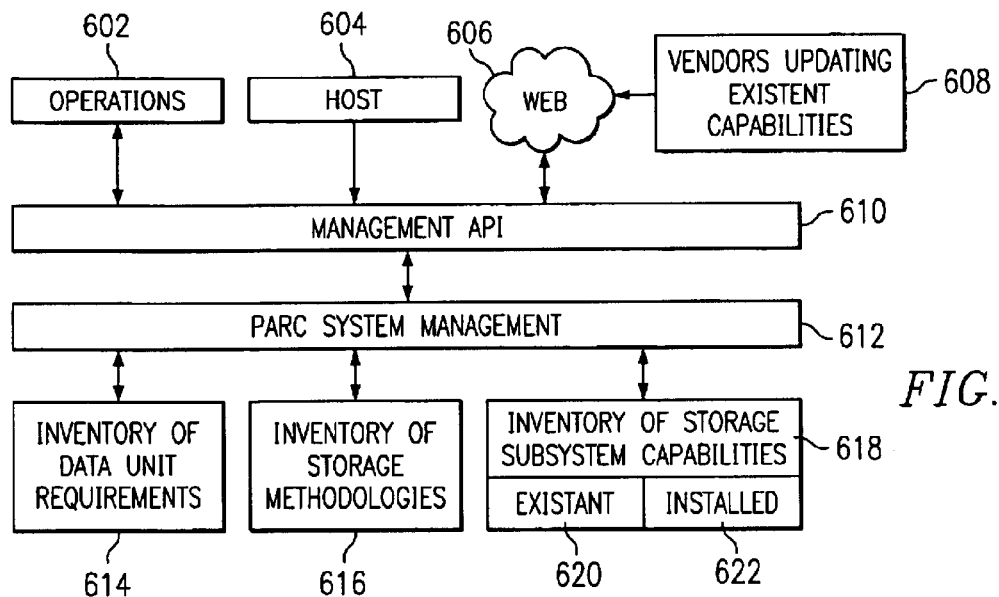
FIG. 6 is an exemplary block diagram of the management API branch illustrated in FIG. 5 in accordance with a preferred embodiment of the present invention.

FIG. 6 is an exemplary block diagram of the management API branch in accordance with a preferred embodiment of the present invention. In this example, Management API 610 may receive input from operations 602, host 604 or through vendors updating existent capabilities 608, which may be via a distributed data processing system, such as, for example, Internet or web 606. PARC system management 612 provides input and provides output to/from management API 610. PARC system management 612 receives input from inventory of data unit requirements 614 along with inventory of storage methodologies 616 and inventory of storage subsystem capabilities 618. Inventory of storage subsystem capabilities may be made up of existent storage subsystem capabilities 620 and installed storage subsystem capabilities 622. If a data unit requirement or a storage methodology requires a particular storage subsystem capability, it needs to be determined as to whether the storage subsystem capability actually exists and, if so, whether the capability is actually installed on an available subsystem. If the storage subsystem capability is actually installed on an available subsystem, the required capability may be provided to satisfy data unit requirements 614 and/or implement a storage methodology 616. However, if the data unit requirement or the storage methodology finds no capability existent within the inventory of storage subsystem capabilities, the data unit requirement and/or the storage methodology may request updates to subsystem capabilities 618 by way of vendors updating existent capabilities 608.

Furthermore, operations may be advised when existent capabilities provide a superior solution over that provided by the installed capabilities. Operations may also be informed when no solution is available utilizing the installed capabilities but may be made available via existent but not installed capabilities. Then operations may be advised when no solution may be found for the stated requirements.

Figure 7:
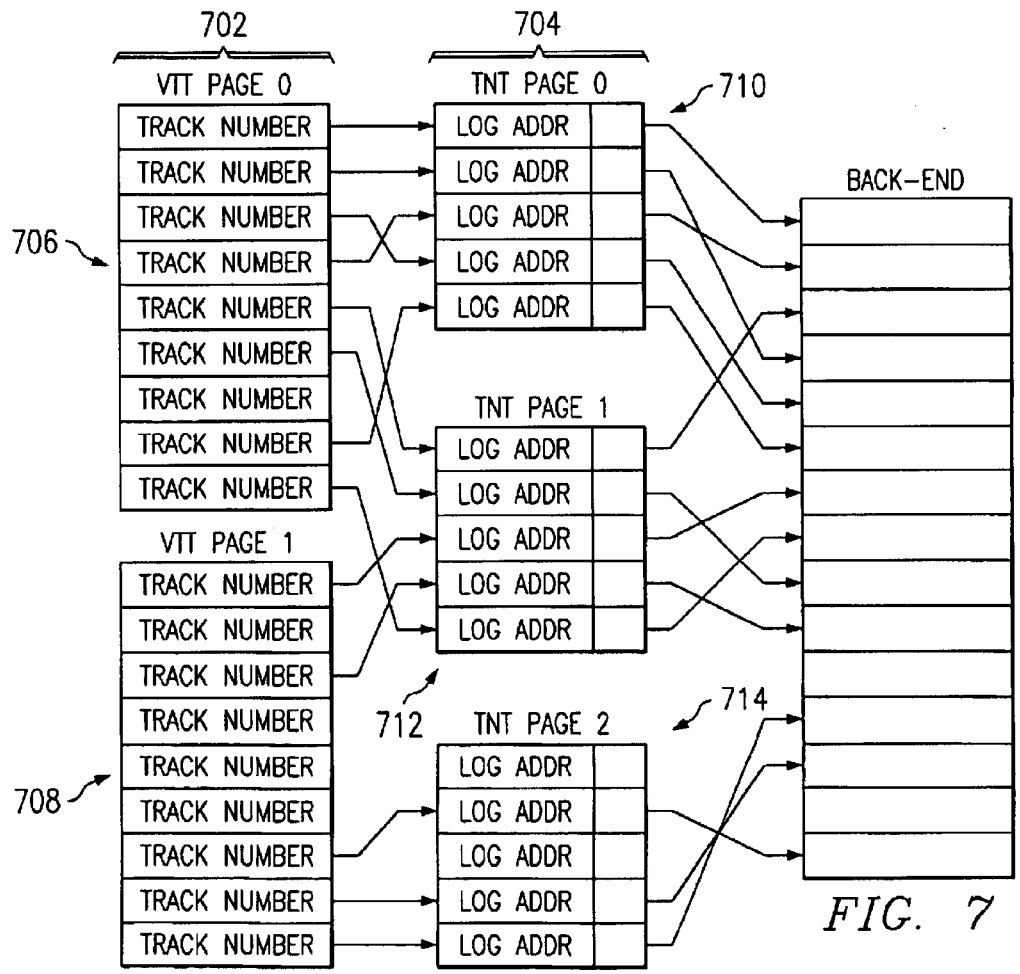
FIG. 7 is an exemplary diagram of a virtual track table and a track number table.

FIG. 7 is an exemplary diagram of a virtual track table and a track number table. Virtual track table 702 and track number table 704 are tables that may be used in a storage subsystem by a processor, such as processors 210–224 in FIG. 2. Some of the mapping schemes force the manipulation of many pointers in order to perform operations on large sets of mapped data. Some mapping schemes also force the allocation of mapping tables for all possible virtual addresses whether or not those addresses are actually used. FIG. 7 depicts prior art which is extended by the present invention.

The present invention also provides a system using a multi-layer virtual mapping tree method that provides very fast access to the mapped data locations and still minimizes the storage required for the mapping tables themselves. The multiple-layer tables allow fast lookup algorithms, but may allow only the mapping table units that point to allocated storage units to be instantiated, therefore, saving mapping table space. These multi-layer mapping tables, in the case of data copies, also allow only the mapping table units for changed data to be instantiated, again saving mapping table space.

In addition, the present invention provides for using a hidden copy/snap copy scheme where the mapped units that are involved in the snap copy are tracked in multiple ways, for example using bit maps, pointer tables, and multilayer bit maps, thereby reducing the table entries to be manipulated to perform snapshot-like operations. An improvement for some workloads and types of data is to use dynamically assigned pointer ranges to track the snap copy data, thereby possibly using less storage than bit maps. Furthermore, the present invention provides using manipulation of entire sections (i.e. subtrees) of the multi-layer virtual mapping tree to speed up operation on large sets of data and to allow additional functions that may be time consuming using other methods.

To achieve the above objectives of the present invention, the original multi-layer map tree may be modified to add map table meta-data. After modification of the original multi-layer map tree a map table section separation may be performed both in the horizontal and vertical directions. Also, the operations of promoting and demoting sections of the map table (subtrees) may be added. Therefore, this gives the present invention the added flexibility of operation and increased access to data locations while saving on map table space.

The present invention manages virtual storage facilities comprising an organization of computer equipment, for example, a host network, data transfer means, storage controller means and permanent storage means and attachment means connecting these devices together. The computer storage subsystem may be organized using multiple layers of mapping tables which may provide unique identification of the storage location of the data such that individual entries in the mapping tables are variable and may be made self-defining with respect to the amount of data managed. The layers of the tables are variable and may be made self-defining as to existence and may be implemented on a piecemeal basis. The existence of individual tables or parts of individual tables is variable and such that actual presence of any of the table information is by demand.

The present invention may also further include a range of data wherein the range of data management is correlated to the layer of the mapping tables addressed. The coordination may be, for example, an algorithm, via a pointer system, via a pointer to correlation logic or via a tree structure. The range of data managed may also be independent of the layer of the tables accessed. Mapping consistency is managed algorithmically or mapping consistency is managed via pointers to boundary information. The boundary information may include, for example, description of size of data units mapped, a description for a like set of entries, a unique description for each entry, a specified default size for a set of entries, including exception flags for modified entries and a bit map. The description of the size of the data units mapped may be by way of a pointer with an address range or a pointer with a unit size. Mapping consistency may be managed via a combination of algorithms, boundary information, and pointers to boundary information. Multiple layers may include a first level of management directing to one or more intermediate levels of management, thereby directing to a final level of management, which may provide the necessary controls to directly access the data.

A means to indicate that the virtual address space mapped by an entry is not known, not used or not allocated may also be included. Therefore, individual tables in the mapping may then be able to be paged to secondary storage and brought into primary storage when needed. Tables for unallocated space may not be instantiated at all until the unallocated space is used or allocated. Boundary information may consist of, for example, fixed mapping wherein every entry in the table has the same extent, i.e. range of virtual space, and location which may be computed, variable mapping in which every entry in the table is unique and default variable in which there is a default extent size and a map of which entries are exceptions.

Figure 8:
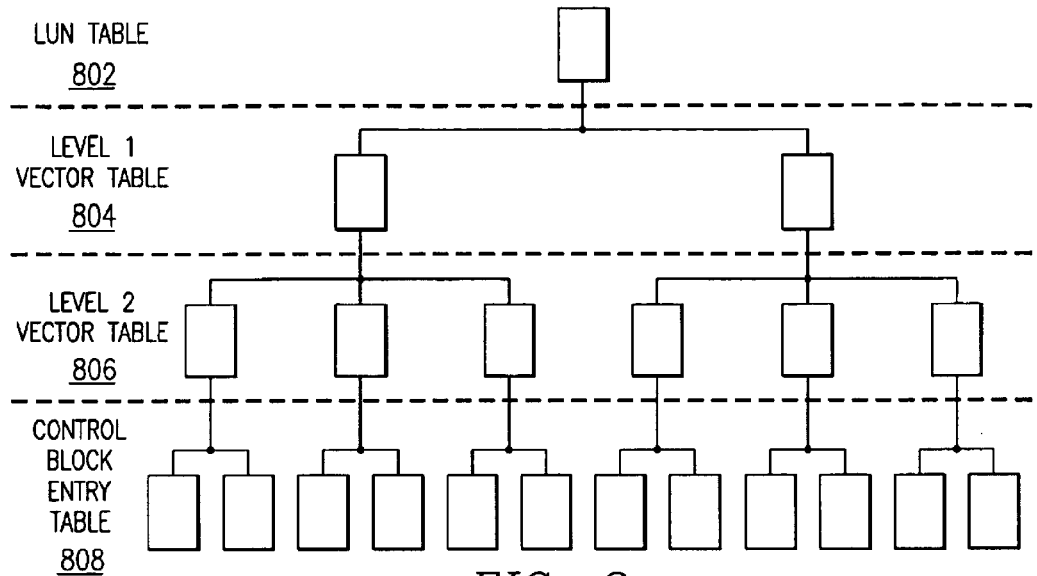
FIG. 8 is an exemplary illustration of a hierarchical relationship of a mapping table in accordance with a preferred embodiment of the present invention.

FIG. 8 is an exemplary illustration of a hierarchical relationship of a mapping table in accordance with a preferred embodiment of the present invention. A map may be made up of several layers. These layers create a hierarchy used to facilitate the location of an entry that may describe the actual location of the data. Each layer points to a finer granularity than the layer below it. For example, the level 1 vector table 804 entries each describe, for example eight gigabytes of a Logical Unit Number (LUN) address space, each level 1 entry points to level 2 vector table 806 whose entries each describe, for example, eight megabytes of a LUN address. The amount of space required to store layers 802 and 804 is small enough in this example so that dedicated memory may be set aside to hold them, thereby ensuring that any access requiring data stored in either level 802 or 804 will be found. Therefore, hits at these levels (802 & 804) will speed the processing of the mapping tables.

In this example, LUN table 802 is a vector table with, for example, 256 entries, in which LUN table 802 is indexed by combining target and LUN addresses. There is one entry for each target and LUN combination. The entry contains a vector to the next table in level 1 vector table 804 layer or contains a null value if no target address or LUN address has been created. LUN table 802, in this example, requires 1024 bytes of memory. LUN table 802 may be pinned in memory.

Level 1 vector table 804 contains, in this example, 256 entries that represent the LUN eight gigabyte segments. Level 1 vector table 804 is indexed by using the most significant byte or bits 31–24 of the logical block address. Each entry either contains a vector to level 2 table 806 or contains a null value. While the space to store all the level 1 vector table 804 pointers is reserved, in this example, for 256 entries, level 2 table 806 is only populated with enough entries to represent the size of the host LUN. That is, if the host LUN has a capacity of, for example, 50 gigabytes, there may be seven entries in level 1 vector table 804. Level 1 vector table 804 requires, for example, up to 256 kilobytes (kb) of memory. Level 1 vector table 804 is also pinned in memory.

Level 2 vector table 806 contains, in this example, 1024 entries and is indexed by bits 23–14 of the logical block address. The entries in level 2 vector table 806 may contain either a pointer to a control block table or a null value. As each level 2 vector table 806 represents, for example, eight gigabytes of LUN address space, a null value may be present for addresses that exceed the capacity of the LUN up to, for example, eight gigabytes of boundary. Each entry in level 2 vector table 806 represents, for example, eight megabytes of LUN address space. Level 2 vector table 806 may require, for example, 4096 bytes of memory and is pageable. Level 2 vector table 806 may have a higher priority than control block table 808 and may only be swapped out of the table memory space to make room for more table information when necessary (i.e., when no lower level table information is available to be swapped out).

Figure 9:
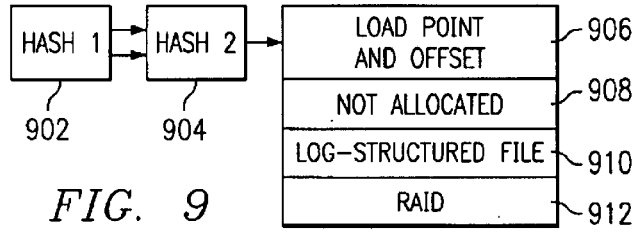
FIG. 9 is an exemplary diagram of a portion of a mapping table describing an address range with four distinct sections in accordance with a preferred embodiment of the present invention.

The lowest layer, in this example, in the map is control block table 808. Control block table 808 is made up of, for example, 256 control block entries. Bits 13–6 of the logical block address are used as an index into control block table 808. Control block table, in this example, represents eight megabytes of the LUN address space. Each control block table 808 requires, for example, 4096 bytes of memory. Control block table 808 is pageable and may have a lower priority than level 2 vector table 806 and may be swapped out of the mapping table memory space to make room for more entries (e.g., other level 808 entries) before level 2 vector table 806 is swapped. Control block table 808 may be swapped on a LRU basis. FIG. 9 is an exemplary diagram of a portion of a mapping table describing an address range with four distinct sections in accordance with a preferred embodiment of the present invention. Hashing algorithms are a well known mechanism for storage subsystems to manage space and resolve an input address to a physical storage location. Hash algorithm 1 902 and hash algorithm 2 904 are serially implemented algorithms that may be used in a storage subsystem by a processor, such as processors 210–224 in FIG. 2. Hash algorithm 2 904 may resolve to several sections. Each section may in turn be mapped using different mapping techniques, such as, for example, load point and offset section 906, not allocated section 908 log-structured file (LSF) section 910 and RAID section 912. These mapping techniques, load point and offset, log-structured files, using a pointer and length for unallocated space, RAID, and the like, are well known mapping techniques in the computer industry. The present invention is directed to a mechanism for combining mapping techniques and dynamically modifying the specific mapping technique used for a particular subset of data. Such dynamic modification may include changing the mapping technique from one technique to another, then possibly to another, or perhaps back to a previously used technique.

Figure 10:
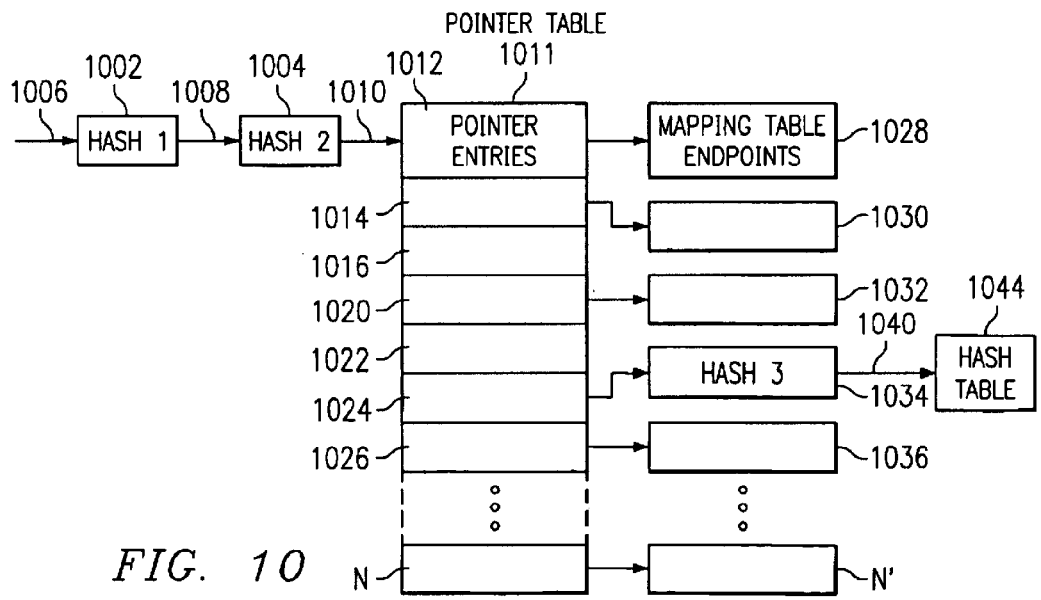
FIG. 10 is an exemplary block diagram of a multi-layer mapping table in accordance with a preferred embodiment of the present invention.

FIG. 10 is an exemplary block diagram of a multi-layer mapping table in accordance with a preferred embodiment of the present invention. Hash algorithm 1 1002 produces hash values as output. Logical address 1006 is input into hash table 1002. Hash algorithm 1 1002 may not require modification due to dynamic changes to the mapping. Hash algorithm 1 1002 may only need modification to reflect logical device definition changes. Hash value out 1008 is input into hash algorithm 2 1004. Hash algorithm 2 1004 may be modified as the mapping changes. Hash value output 1010 from hash algorithm 2 1004 is input into pointer table 1011. Pointer table 1011 consists of pointer entries 1012–1016 and 1020-N. The pointer changes as the mapping changes. Hash algorithm 2 1004 and pointer table 1011 are held consistent with respect to range. Also included are mapping table endpoints 1028, 1030, 1032, 1034, 1036 and N'. Mapping table endpoints 1028-N' can be omitted, for example, in the case of unallocated space. Mapping table endpoints 1028-N' may be a single entry or a complex set of entries and further logic, for example, such as hash algorithm 3 1034 which produces hash output 1040 which is an input to hash table 1044. The total number of mapping table entry points may vary dynamically during use as the table entries are modified.

FIG. 11 is an exemplary illustration of FlexRAID in accordance with the preferred embodiment of the present invention. FlexRAID allows a controller software to place RAID stripes or mirrors across any of the drives attached to the controller software. Conventional RAID systems bind sets of drives together to form a RAID set. These Raid sets may determine the RAID level for the LUN they represent. For example, a set of five drives may be bound together in a RAID set. This RAID set of five drives may be presented to a host as a LUN structure and a self-describing RAID stripe or mirror.

In an architecture with a paging LSF map structure, data locations referenced by a computing system may not be updated in a fixed location. Data is located by a translation table identifying the current residency address of the data. This permits the data to be relocated anywhere in the subsystem while maintaining a logically consistent address to the host computer system.

By expanding on this concept, a RAID group may be thought of as a single stripe with a RAID type attribute. For example, each RAID stripe written may be thought of as a RAID stripe group. Therefore, since static binding of disk drives may not be required, a collection of disk drives may be scattered on a "best fit algorithm" across any or all members of the storage pool. Thus, disk drives may be added to the storage pool without requiring conformance to disk geometry or topology attributes.

The present invention obtains a unit of allocation for the RAID stripe from a set of disk drives. The set may be the minimal number of disks necessary for the required stripe size. However, unlike conventional RAID disk subsystems, the set may include a grouping of disks, none of which is the same type and model as the others. The stripe may be spread across the subset of the set of drives where the subset consists of the required number of units for the RAID stripe. The next stripe written may include some of the drives for the previous stripe, but also some drives in the domain which may better satisfy a space and load balance fit.

In this example, a set of disk drives, such as, disk drives 1110, 1120, 1130, 1140, 1150 and 1160 are shown. In this example, disk drive 1110 has a capacity of 500 allocation units. The other disk drives 1120–1160 have a capacity of 1000 allocation units of space. A RAID stripe, for example, RAID stripe 1, is a 4+1 RAID 4 group. Four allocation units for data, for example, stripe locations 1111, 1121, 1131 and 1141, each on a different disk drive, are combined with 1 allocation unit for parity data at location 1151 to be written as one stripe. The data units are not required to be symmetrical in location, such as, occupying the same physical addresses on the disk. Each unit is maintained as a discrete unit and not tied geometrically to the other units.

Following the allocation and RAID stripe 1 write, four disk drives, for example, disk drives 1120, 1130, 1140 and 1150, have 999 data allocation units free and available for allocation, while disk drive 1110 has 499 allocation units free and disk drive 1160 still has 1000 allocation units free. Disk drives 1110, 1120, 1130, 1140 and 1150 each have 1 data allocation unit not available (i.e., allocated and written).

Then the next data write operation is initiated for stripe 2, also a 4+1 RAID level four group. The space management mechanism acquires five more data allocation units, such as, for example stripe locations 1122, 1132, 1142 and 1152, four for data and one for parity data at stripe location 1161. As a result, disk drive 1160 with 1000 units available is selected to provide one allocation unit. Following this allocation and RAID stripe write, disk drive 1110 has 499 units free for allocation, the next four disk drives, for example, disk drives 1120, 1130, 1140 and 1150 have 998 units free for allocation and drive 1160 has 999 units free for allocation.

In a similar fashion, stripe 3 may be allocated and written to stripe locations 1123, 1133, 1143, 1153 and 1162. In addition, stripe 4 may be written as a different RAID group size, for example as a 3+1 RAID group and may be allocated and written to locations 1124, 1134, 1144 and 1163. Furthermore, a different RAID level may be used, for example, stripe 5 may be written as a mirror (RAID level 1) using locations 1154 and 1164.

Various algorithms may be used to determine which disk drives and which allocation units on the disk drives are to be allocated for a new stripe. This may include, but is not limited to, the following:

a) the allocation priority may be set by which disk drives have the most number of free allocation units;

b) the highest percentage of free allocation units;

c) the allocation units closest to the most recent previous stripe write;

d) the allocation may be based on selecting the highest or lowest performance disk drive first;

e) prorated allocation based on trying to fill a certain number of drives such that they all reach maximum capacity simultaneously independent of device capacity; or e) any combination of the above.

In addition to the allocation of stripes freely across the disk drives in a pool of disk drives, the present invention allows for the stripes to use different RAID configurations. For example, one RAID stripe may be stored as a 4+1 RAID 4 configuration, while the next stripe may be stored as a simple 1+1 mirror, and further, the next stripe may be stored as a 3+1 RAID 4 configuration.

FIG. 12 is an exemplary illustration of a control block entry format and modifications to the control block entry in accordance with a preferred embodiment of the present invention. A control block entry which, for example, may be contained within control block entry table 808 in FIG. 8 may contain the following format:

Bytes 0–3 may contain:

LUN 1202 is the LUN address of a back-end storage device that contains data;

Flags 1204 is made of up to four one-bit flags. In this example, only two flags are identified:

Update flag which indicates that data in a cache has been updated and the data on the LUN is no longer current Busy flag which indicates the data is in transition and should not be altered at this time;

Unused byte 1206; and

Number of blocks 1208 which is the number of blocks used to contain a 32K byte entry. Number of blocks 1208 is required for compression as it allows variable length entries to be written to a disk.

Bytes 4–7 may contain:

Logical Block Address 1210 which is the Logical Block Address on the data on the LUN.

Bytes 8–12 may contain:

Cache pointer 1212 which is used in conjunction but not in place of the LUN/LBA address. If an entry is in cache, cache pointer 1212 contains a pointer to the cache entry.

Bytes 13–16 may contain:

Unused bytes 1214–1220.

However, in order to provide RAID recovery, the mapping structure may be modified to identify either the parity drive associated with the RAID stripe or another drive in the mirrored set. The modifications to the control block entry may be:

Bytes 0–3 may contain in addition to LUN 1202, Flags 1204 and Number of Blocks 1208 as described above, Parity LUN (PLUN) 1222. In addition, Bytes 13–16 may contain Parity LUN Logical Block Address 1224 instead of unused bytes 1214–1220. Parity LUN 1222 is the LUN address of the drive containing either the parity information for the RAID stripe or another drive in the mirrored set containing host information. Parity LUN Logical Block Address 1224 is the logical block on PLUN 1222 that the parity is written to.

Another important feature of FlexRAID is the self-describing nature of data. Each stripe in the stripe contains information that describes the contents of the stripe and the stripe's relation to other members of the stripe.

A difference between FlexRAID and a conventional RAID system is that meta-data is associated with each stripe. As each data stripe is written, the meta-data is prefaced to the stripe. The meta-data written to the parity disk may be actually an XOR'ed parity of other pieces of meta-data. The meta-data may be, for example, one 512 byte block long and may contain the information as shown in FIG. 13 which is an exemplary meta-data block in accordance with a preferred embodiment of the present invention.

Figure 14:
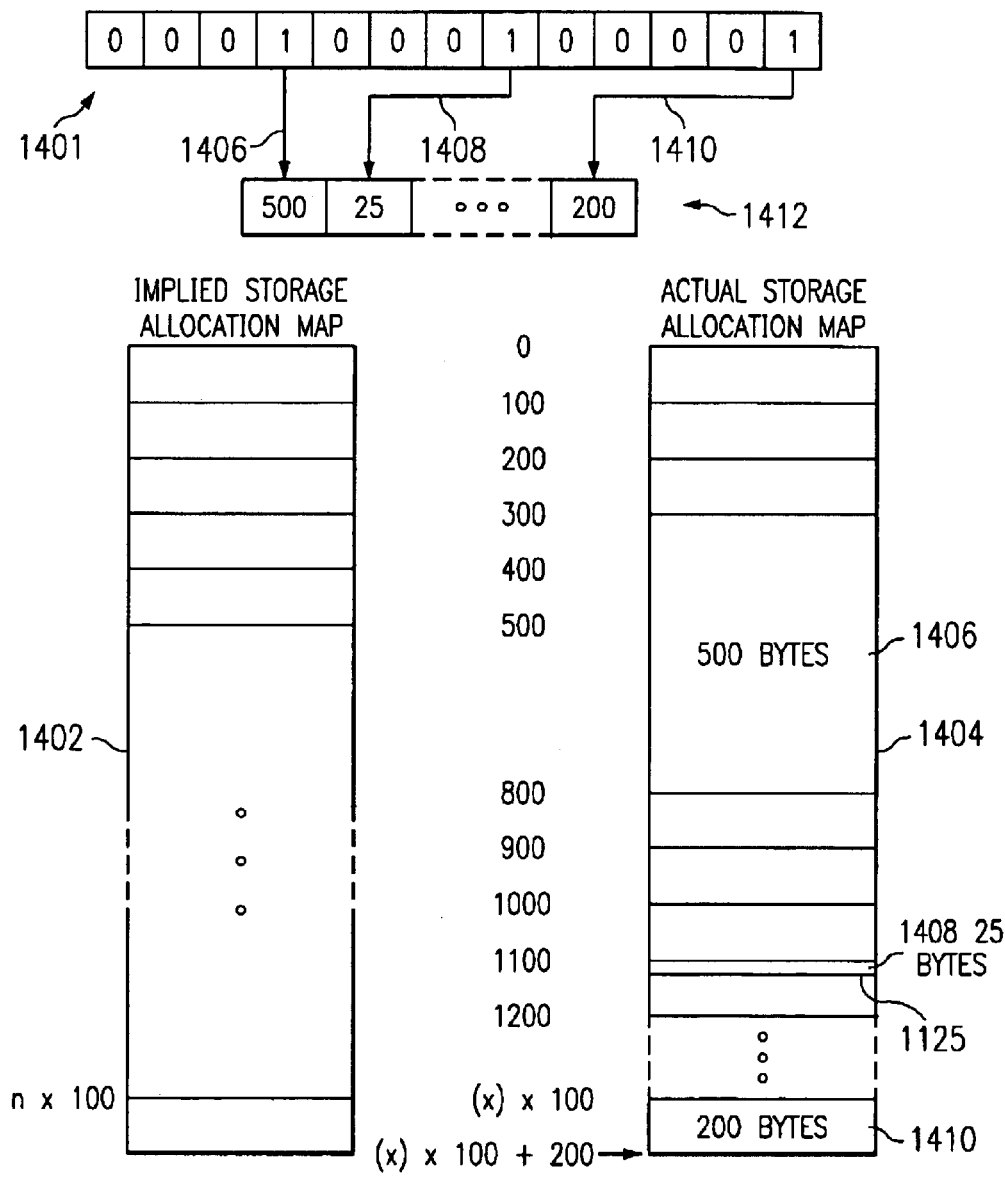
FIG. 14 is an example of a default variable within boundary information in accordance with a preferred embodiment of the present invention.

FIG. 14 is an exemplary illustration of a default variable within boundary information in accordance with a preferred embodiment of the present invention. There may be a default extent size and a map 1401 of which entries are exceptions. In this example, assume a layer n with table $n_a$ and entry x. Also, assume a location xx in which a first extent begins. An extent is EE bytes in size, however, in this example, each extent is 100 sectors. Except as noted in an exception map 1401, the location of the extent may be calculated up to an exception point. A map of storage such as map 1402, is implied by the algorithm and may be calculated so map 1402 may not even be stored until exceptions exist.

Entry 1406, which in this example is 500 bytes in size, is stored in exception size table 1412. In addition, entry 1408, which is 25 bytes in size, is stored in exception size table 1412. Additional entries may be stored in exception size table 1412 up to nth entry 1410 which is 200 bytes in size. Implied map 1402 is implied by a regular mapping every 100 sections up to n×100 sections.

As shown in FIG. 14, actual storage allocation map 1404 will require the entries from maps 1401 and 1412 to interpret addresses. Since the first three entries in map 1401 are empty, the first data entry stored in map 1412 is entry 1406 which, in this example, is 500 bytes in size. Therefore, entry 1406 will be stored in map 1412 and redirects address calculations beginning at the third 100 sector entry. The data associated with entry 1406 will be stored from 300 to 800 in actual storage map 1404. Since the next three entries in map 1401 are empty, entry 1408 will be stored in map 1412 and control addressing beginning at 1100. This takes into account the end of entry 1406 which is at 800 in storage allocation map 1404 plus the spaces for the next three empty entries in map 1401.

Entry 1408 is 25 bytes in size. Therefore, data for entry 1408 will be stored beginning at 1100 in storage allocation map 1404 and ending at 1125 in storage allocation map 1404. Then entry 1410 will be stored in map 1412. Since the entries after entry 1408 are empty in map 1401, data for nth entry 1410 will be stored in storage allocation 1404 at a location x times 100 from 1125 which is the end of entry 1408 in storage allocation 1404. Nth entry 1410 is 200 bytes in size. Therefore, since nth entry 1410 is the last entry in map 1412, storage allocation 1404 ends at a value of 1125 plus x times 100 plus the 200 bytes represented by nth entry 1410.

Therefore, the present invention provides a system using a multi-layer virtual mapping scheme where the mapped units that are involved in managing storage allocation are tracked using a bit map and an exception table, thus reducing the table entries to be manipulated to perform storage management operations.

In addition, the present invention provides a mechanism by which instant copies of stored data in a variable dynamically changeable mapping scheme storage device may be made. The mechanism of the present invention may be embodied as hardware, software, or a combination of hardware and software. In a preferred embodiment, the instant copy mechanism of the present invention is implemented as software instructions executed by a processor, such as any one or more of processors 210–224. Although the principle embodiment is software instructions executed by a processor, it should be clear to those of ordinary skill in the art that the functions of the present invention may be "hard coded" into hardware modules and components without departing from the spirit and scope of the present invention.

In order to clarify the operations and processes of an instant copy using the present invention described hereafter, it is first beneficial to define some terminology that will be used in the description. First, it should be noted that there are three views of the instant copy operation that will need to be considered: (1) the host/server/using system view, (2) the storage system view, and (3) the physical placement/physical addressing view.

From the viewpoint of the using system (e.g., a server or application processor) the instant copy is seen as a command to do an operation such as, for example, copy FROM: address A through address B in a data source (this is what is known as the original data) TO: address A' through B' in a data destination (this is what is known as the copy data). However, from the viewpoint of the storage system, these address ranges are inputs to a mapping.

A mapping translates or converts from the using system's 'virtual' address to a management system's logical structures and then to the storage system 'physical' location(s) (or address(es)) where the data is stored. Note that in a virtual storage system the mapping of the virtual addresses to physical locations may change over time.

The physical placement of the original data is described by a mapping mechanism known as the original data map. This identifies the physical storage location used to store the original data. This is not part of the using system view, but is in the storage system view.

The physical placement of the copy data is described by a mapping mechanism known as the copy data map. This identifies the physical storage location used to store the copy data. This is not part of the using system view, but is in the storage system view.

In addition to the above, the following are some additional definitions to be aware of:

The Initial physical storage area is the set of physical storage locations of the original data at the moment of the instant copy operation. It is also the location of the copy data upon the initial execution of the instant copy command. After the execution of the instant copy command/operation, write activity by the using system will cause/require the use of additional physical storage area(s). (Because a write to either the original data or to the copy data causes a difference between the two, and they can no longer be stored as the same physical data, therefore physical storage is required to store, at a minimum, the difference).

Additional Physical Storage Areas are the locations of storage space used to accommodate the additional data resulting from the using system (server) writing to either the original data or to the copy data.

Old Data is that data that existed and was known as the original data at the moment of the instant copy operation, and is also now associated with the copy data. (i.e., the specific data address, such as a record, has not been the target of a write operation since the instant copy).

New data is that data that was written, by the using system, to either the original data or the copy data, subsequent to the instant copy command execution.

New original data is that new data that was written, by the using system, specifically to the original data.

New copy data is that new data that was written, by the using system, specifically to the copy data.

Old original data is data associated with the original data that has not been overwritten (not been changed) by the using system (server) since the instant copy command execution.

Old copy data is data associated with the copy data that has not been overwritten (not been changed) by the using system (server) since the instant copy command execution.

Having set forth the terminology that will be used in the description of the instant copy operations and processes of the present invention, the following is a description of exemplary embodiments of the instant copy features of the present invention. It should be noted that the following description sets forth exemplary embodiments which are not intended to be limiting but rather illustrative of the present invention.

The known mechanisms for making instant copy operations create a copy data map in the following manner. First, a copy of the original data map is made and used for the copy data map. A local mechanism is then used to track the changes to the original map. For example, a bit map may be used that identifies which blocks have been written to.

The present invention differs from these known instant copy mechanisms in that at first only a pointer to the original data map is created. Thereafter, as needed, the copy data map, starting as a single pointer, is modified with additional information (meta-data) relating only to those sections which change as write activity occurs. Thus, the present invention reduces the amount of storage space required to make an instant copy since a complete duplicate of the original data map is not required.

As mentioned above, mapping of data may take many forms, including load point and offset, log-structured file, and the like. Moreover, with the present invention as described above, different types of mapping may be used within the same virtual storage volume. In other words, the storage device may be a variable dynamically changeable mapping scheme storage device.

In order to make an instant copy of data stored in a variable dynamically changeable mapping scheme storage device, the type of mapping used to store the data must be identified and an appropriate copy technique used to copy the data. The present invention provides a mechanism for identifying the mapping used and selecting an appropriate copy technique to copy the data based on the identified mapping.

Moreover, the particular copy techniques themselves, are aspects of the present invention that aid in minimizing the amount of meta-data associated with a virtual storage volume. Using these various copy techniques allows multiple instant copy procedures to be performed in parallel, multiple mirror processes to be performed in parallel and allows parallel instant copy operations to be performed on various physical devices.

Figure 15:
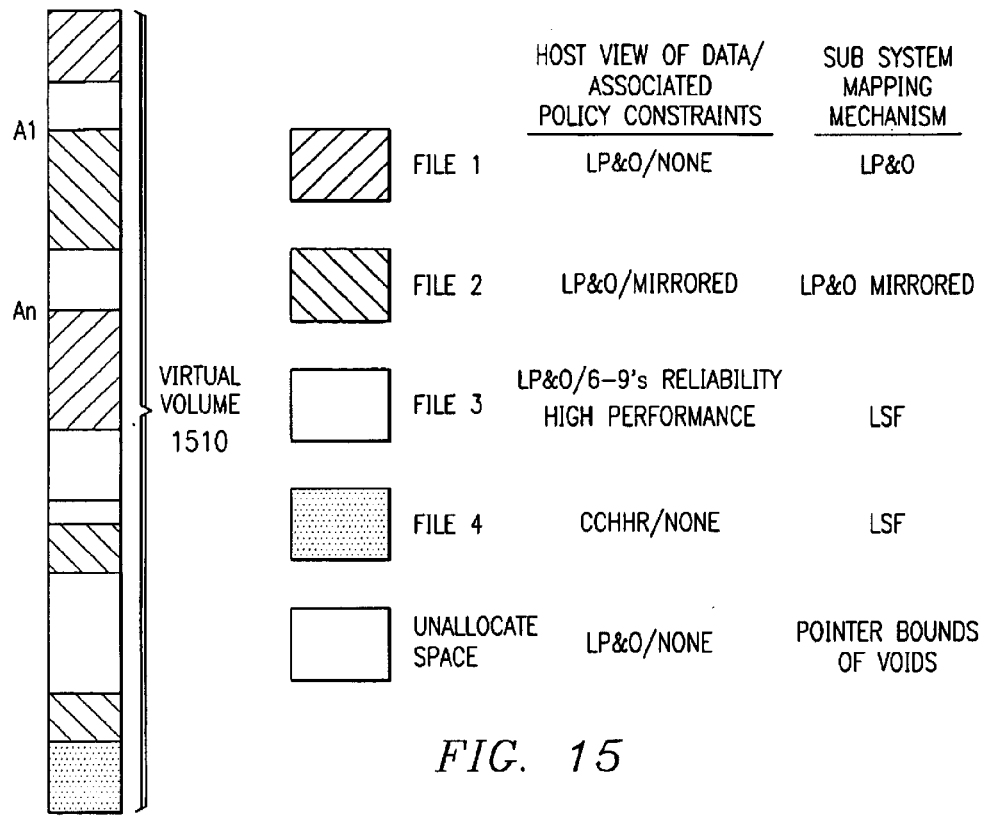
FIG. 15 is an exemplary diagram of a variable dynamically changeable mapping scheme virtual storage volume in accordance with the present invention.

FIG. 15 is an exemplary diagram of a variable dynamically changeable mapping scheme virtual storage volume in accordance with the present invention. As shown in FIG. 15, a plurality of files, i.e. groups of related extents, are stored on virtual volume 1510. FIG. 15 also shows unallocated space where no files are stored. Each file is viewed by the host system in a different manner with associated policy constraints. These policy constraints are requirements, placed on the storage system by the using system, that force specific storage outcomes, such as specifically demanding a type or classification of performance and/or redundancy (e.g. mirroring, as in the case of file 2) or specifically demanding certain levels of performance or redundancy, (as with file 3). The using system may also not supply specific policy constraints, leaving the storage system to use appropriate defaults.

For example, files 1, 2 and 3 are viewed by the host system as load point and offset files, i.e. the files are accessible using load point and offset address mapping. In addition, file 1 has no policy constraints, file 2 is mirrored, and file 3 has the policy constraint 6-9's Reliability High Performance (The notion of a specific number "N" of 9's of reliability (e.g. 6-9's) (Six nine's) means that the probability of not losing a piece of data is 0.999 . . . where "N" is the number of 9's following the decimal point. Therefore, a 6-9's reliability means a 0.999999 probability of no data loss). File 4 is viewed by the host system as a cylinder-head-record type of addressing file with no policy constraints.

The storage sub-system, e.g. the RAID or other type of storage device sub-system, uses a type of mapping for each of the file data based on the host system's view of the data and policy constraints. For example, file 1 is mapped using a load point and offset mapping mechanism, file 2 is mapped using a load point and offset mapping mechanism with mirroring, file 3 is mapped using a log-structured file mapping mechanism, file 4 is mapped using a log-structured file mapping mechanism, and the unallocated space is mapped using pointer bounds of voids. These various mapping mechanisms have been described previously with regard to the description of FIG. 9 above.

As can be seen from FIG. 15, a single virtual volume may contain many different files having data recorded in different areas of the virtual volume and may have varying data section sizes, i.e. extent sizes. Furthermore, each file may have a different type of mapping within the virtual volume. Because these data sections are variable and may have dynamically changeable mapping schemes, it is difficult to perform a simple copy operation from the virtual volume to a new storage area.

For example, assume that a portion of data ranging from A1 to An is to be the subject of an instant copy operation. This portion of data contains data from files 2 and 3. File 2 is mapped using load point and offset with mirroring. File 3 is mapped using log-structured file mapping. Thus, the data for both file 2 and file 3 in the selected portion cannot be copied using the same copy mechanism due to the difference in mapping.

Thus, in order to perform an instant copy operation, it is important to identify the sections of virtual memory containing the data to be copied and the type of mapping mechanisms used for mapping the data to the virtual volume. The present invention provides a mechanism for performing these functions as well as selecting an appropriate copying technique for performing the instant copy operation.

Figure 16:
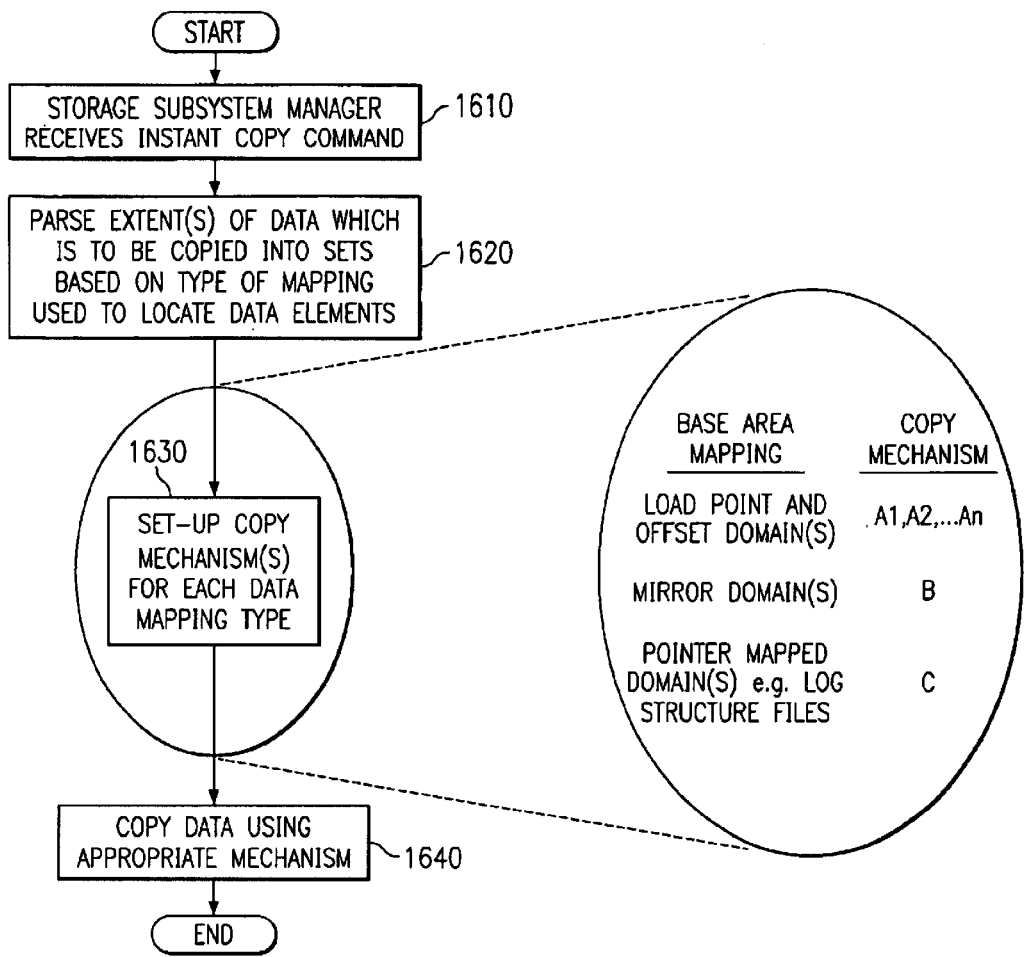
FIG. 16 is a high level flowchart outlining the primary steps in performing an instant copy of a portion of data in a variable dynamically changeable mapping scheme virtual volume storage sub-system.

FIG. 16 is a high level flowchart outlining the primary steps in performing an instant copy of a portion of data in a variable dynamically changeable mapping scheme virtual volume storage sub-system. As shown in FIG. 16, the operation starts with receiving an instant copy command (step 1610). The extents of the data which is to be copied are parsed into sets based on type of mapping used to locate data elements (step 1620).

For example, assume that a portion of virtual volume space ranging from positions 0 to 400 is to be copied using an instant copy procedure. Further, assume that this portion of the virtual volume space is comprised of three files, one ranging from 0 to 100 and having load point and offset type mapping, a second ranging from 101 to 305 having load point and offset with mirroring type mapping, and a third ranging from 306 to 400 having a log-structured file type mapping. In order to perform an instant copy of this section of the virtual volume space, each of these files must be copied using a different instant copy mechanism in order to provide an optimum copy procedure.

Returning to FIG. 16, once the extents of the data which is to be copied are parsed, the copy mechanism(s) for each data mapping type in the portion of data to be copied are then set up (step 1630). In a preferred embodiment, for example, data mapped using load point offset mapping may be copied using one of the copy control methods A1, A2, . . . An as will be described in greater detail hereafter. Data mapped using mirroring may use copy control method B, as will be described in greater detail hereafter, and data mapped using pointer mapped mapping mechanisms, such as log-structured files, may make use of copy control method C, as will be described hereafter.

The instant copy procedure is then performed using the identified copy control mechanisms or methods (step 1640) and the operation terminates. This operation may be repeated for each portion of data to be copied using the instant copy procedure.

Figure 17:
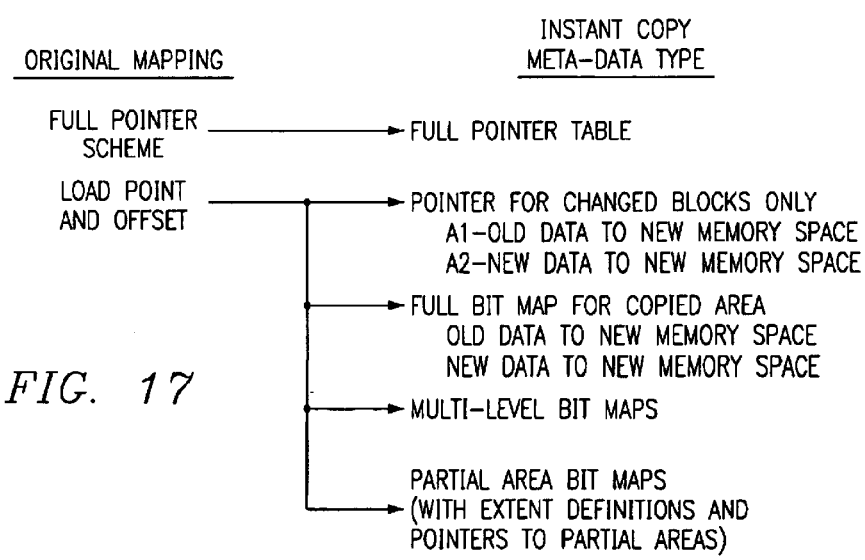
FIG. 17 illustrates the various copy control methods and their association with data mapping mechanisms.

FIG. 17 illustrates the various copy control methods and their association with data mapping mechanisms. As shown in FIG. 17, if the original data mapping mechanism used was a full pointer scheme, such as a log-structured file, the instant copy control method will use a full pointer table (C). If however, the original mapping mechanism used was a load point and offset type mapping, one or more of the following may be used, depending on the circumstances:

1) When the meta-data type provides pointers for changed blocks only, two different copy mechanisms may be used. The first copy mechanism is copying unchanged blocks of data (that is the old data) from a source storage area to a new copy storage area. The second copy mechanism is copying changed blocks of data (that is the new version of the data) from a source storage area to a new copy storage area. These mechanisms are explained more fully hereafter.

2) The meta-data type may provide a full bit map for the copied area. Again the copy mechanism may be either copying unchanged blocks of data (old data) from a source storage area to a new copy storage area or copying changed blocks of data from a source storage area to a new copy storage area;

3) When the meta-data provides multilevel bit maps, the levels of the bit maps must first be resolved to the lowest order bit map covering each subsection or area of the data that is so mapped. Then the same mechanisms described in 2) above may be applied for each individual subsection or area of the data.

4) Partial Area Bit Maps are a combination of extent mapping (which may use any known technique for mapping extents, such as load point and offset) within a large area to be changed, and of bit maps for each extent that has been changed within the area.

Figure 18A:
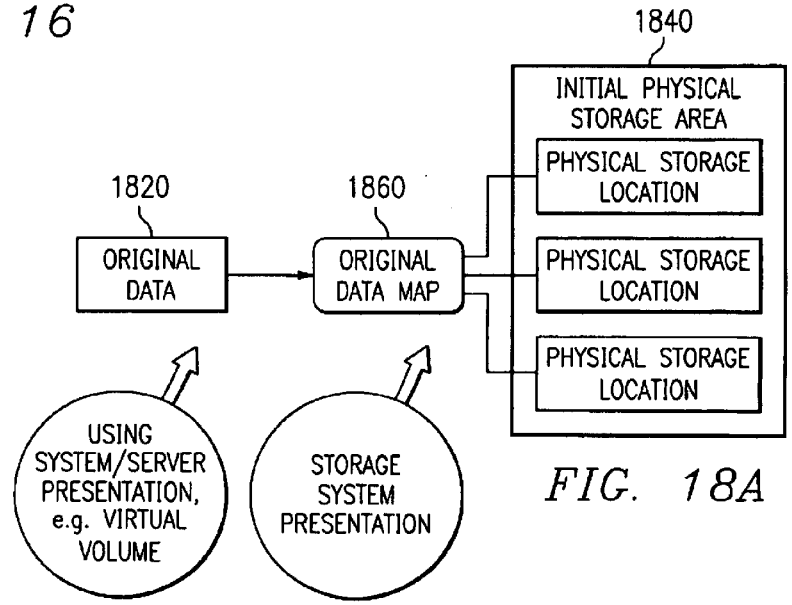
FIG. 18A–C illustrates an initialization of an instant copy procedure in accordance with a first copy method, copy method A1, of the present invention.
Figure 18B:
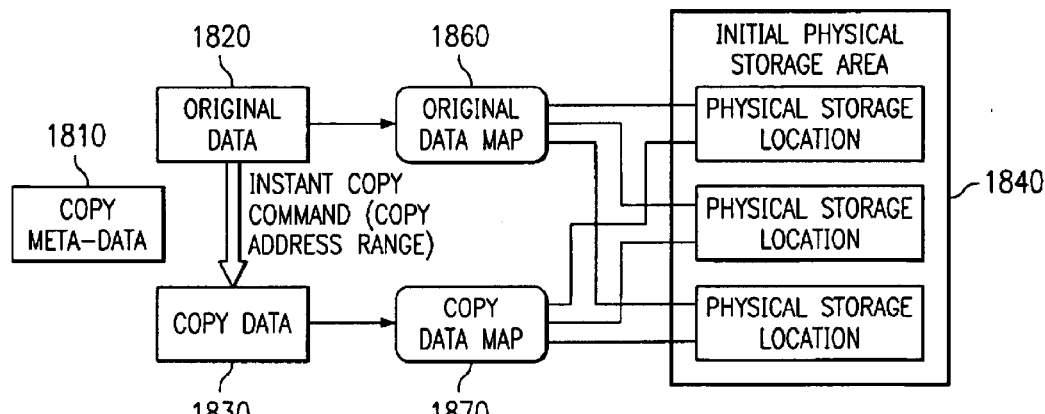
Figure 18C:
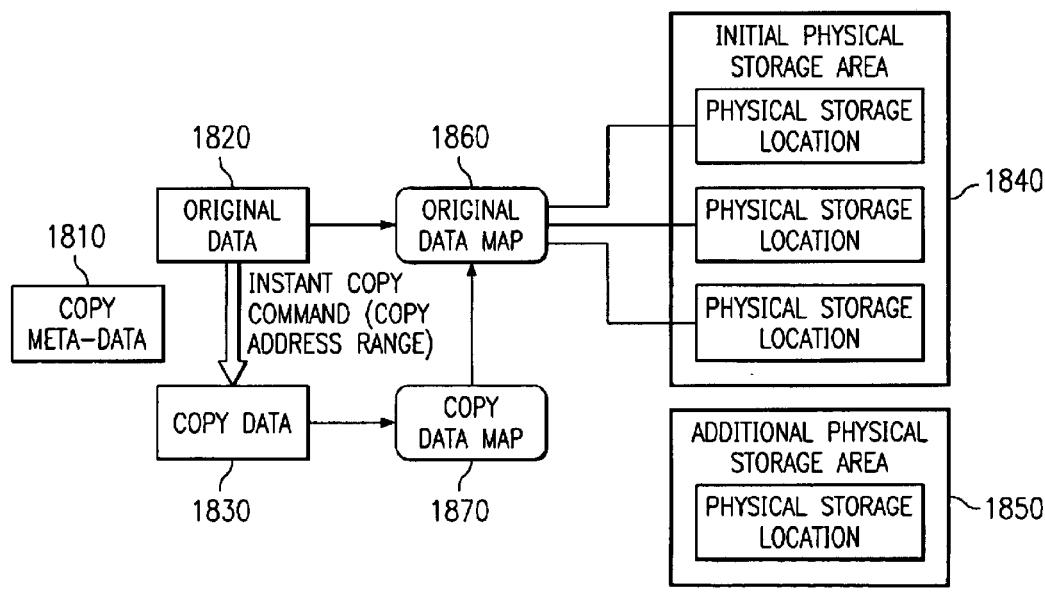

FIGS. 18A, 18B, and 18C illustrate an initialization of an instant copy procedure in accordance with a first copy method, copy method A1, of the present invention. As shown in FIG. 18A, the original virtualization structure has a presentation to the using system called the original data 1820 which is mapped into a storage system presentation via the original data map 1860 to the initial physical storage area 1840 that stores the data.

The current state of the art, shown in FIG. 18B, is exemplified by the StorageTek SVA 9500™. As shown in FIG. 18B, just after the instant copy command is initiated, there exist two instances of the data map, the original data map 1860 and the copy data map 1870. Both maps point to the exact same physical space and will do so until changes are made to the original data or to the copy data.

FIG. 18C is an exemplary diagram illustrating the initialization of an instant copy in accordance with the present invention. As shown in FIG. 18C, the copy meta-data 1810 indicates the data to be copied as well as various parameters about the data to be copied including, for example, the load point and offset of the data. The copy meta-data 1810 is generated based on the parsing of data types described above. That is, when an instant copy procedure is initiated on a portion of data in the virtual volume, the data types of the data in the portion of data are identified and grouped into sets based on the type of mapping used to map the data to the virtual volume. The meta-data for these various sets of data to be copied are the copy meta-data 1810.

The example shown in FIG. 18C makes use of a source, identified as original data 1820, and a copy known as the copy data 1830. The original data 1820 is mapped to an initial physical storage area 1840 used for original data. The initial physical storage area 1840 may be, for example, the location for a virtual volume $vol_v x$. The copy data 1830 may be the designation for a virtual volume $vol_v y$. The instant copy procedure is used to logically copy portions of the original data 1820 from the virtual volume $vol_v x$ to the virtual volume $vol_v y$.

When the instant copy operation is initiated, there is no initial copying performed. This is because both the original data 1820 and the copy data 1830 are identical and thus, only one set of data need be stored. Two separate items of data are required only when a write occurs to overwrite an item of the original data 1820, or the copy data 1830. Thus, the actual copying is not performed until a write occurs to either the original data 1820 or the copy data 1830. One of the items of data will be stored in the initial physical storage area 1840, and the other in the additional physical storage area 1850.

At some time later after initialization of the instant copy operation, a write operation may occur. The write operation may be made to either one of the original data 1820 or the copy data 1830. Whether the write operation occurs to the original data 1820 or the copy data 1830 depends on the particular use to which the original data 1820 and the copy data 1830 are put. For example, if the copy data 1830 is used as a backup storage for the originally stored data in the original data 1820, writes will be made to the original data 1820. If the copy data 1830 is used as a test mechanism, the writes may be made to the copy data 1830.

Figure 19:
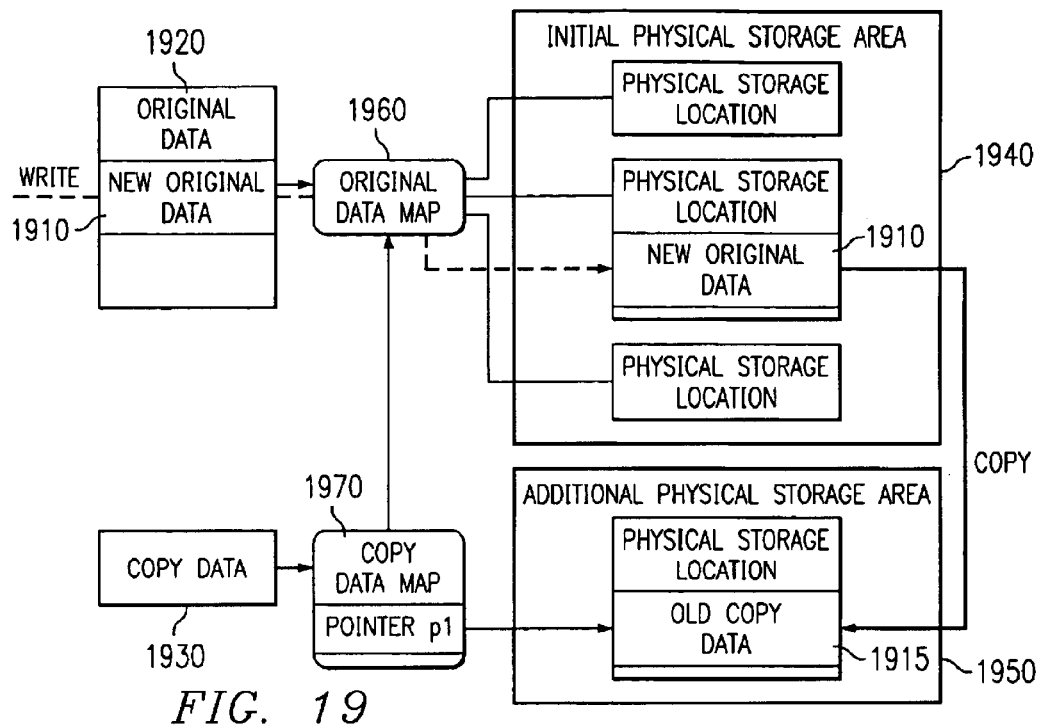
FIG. 19 is an exemplary diagram illustrating an instant copy of data when a write operation is performed on the original data.

FIG. 19 is an exemplary diagram illustrating an instant copy of data when a write operation is performed on the original data 1920. As shown in FIG. 19, when new original data 1910 is to be written to a location in the initial physical storage area 1940, the original data in this location is copied to the additional physical storage area 1950 as old copy data 1915. A new pointer P1 is generated and stored in a pointer table of the copy data map 1870 to point to the old copy data 1915 in the additional physical storage area 1950. Once the old copy data (original data) is copied from the initial physical storage area 1940 to the additional physical storage area 1950, the new original data 1910 may be written to the physical location that was occupied by the old copy data. Thus, the original pointer in the pointer table of the original data map 1960 pointing to the location of the original data 1920 now may be used to reference the new original data 1910, and the new pointer P1 may be used to reference the old copy data 1915 copied to the additional physical storage area 1950.

Figure 20A:
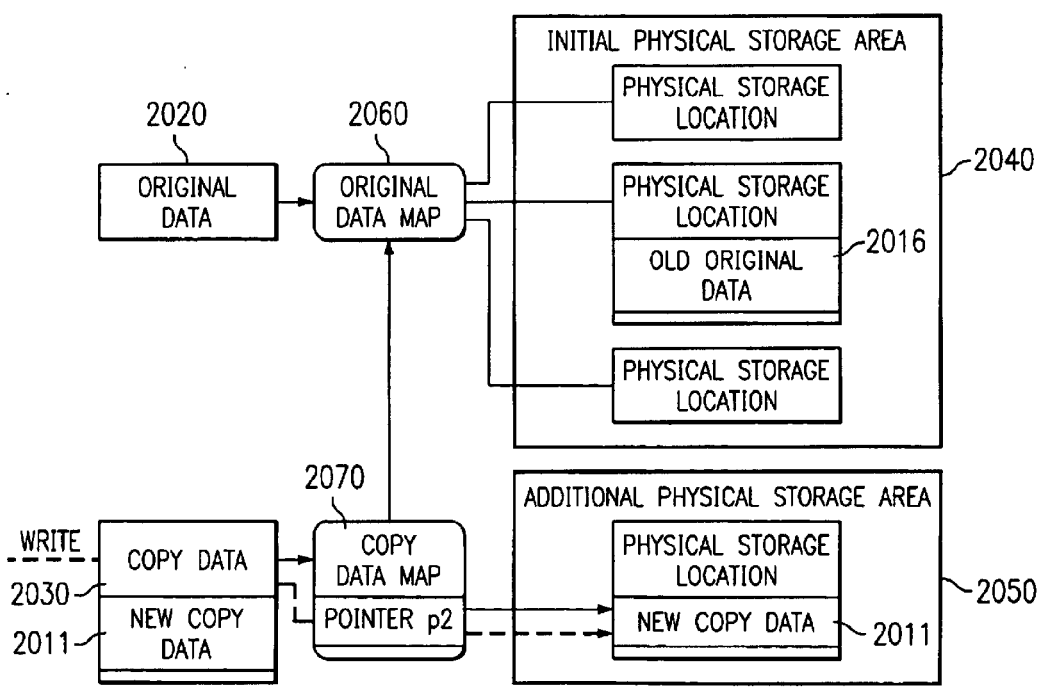
FIG. 20A is an exemplary diagram illustrating an instant copy of data when a write operation is performed to the copy data.

FIG. 20A is an exemplary diagram illustrating an instant copy of data when a write operation is performed to the copy data 2030. As shown in FIG. 20A, new copy data 2011 is to be written to the copy data 2030. In this case, the new copy data 2011 may be written to the copy data 2030 without having to copy data from the initial physical storage area 2040 to the additional physical storage area 2050 because any original data in the initial physical storage area 2040 and in the original data 2020 are the same. Since this data is the same, there is no need to copy it from one location to another. In this case a new pointer P2 is added to the pointer table of the copy data map 2070 that points to the new copy data 2011 written to the copy data 2030 in the additional physical storage area 2050.

Figure 20B:
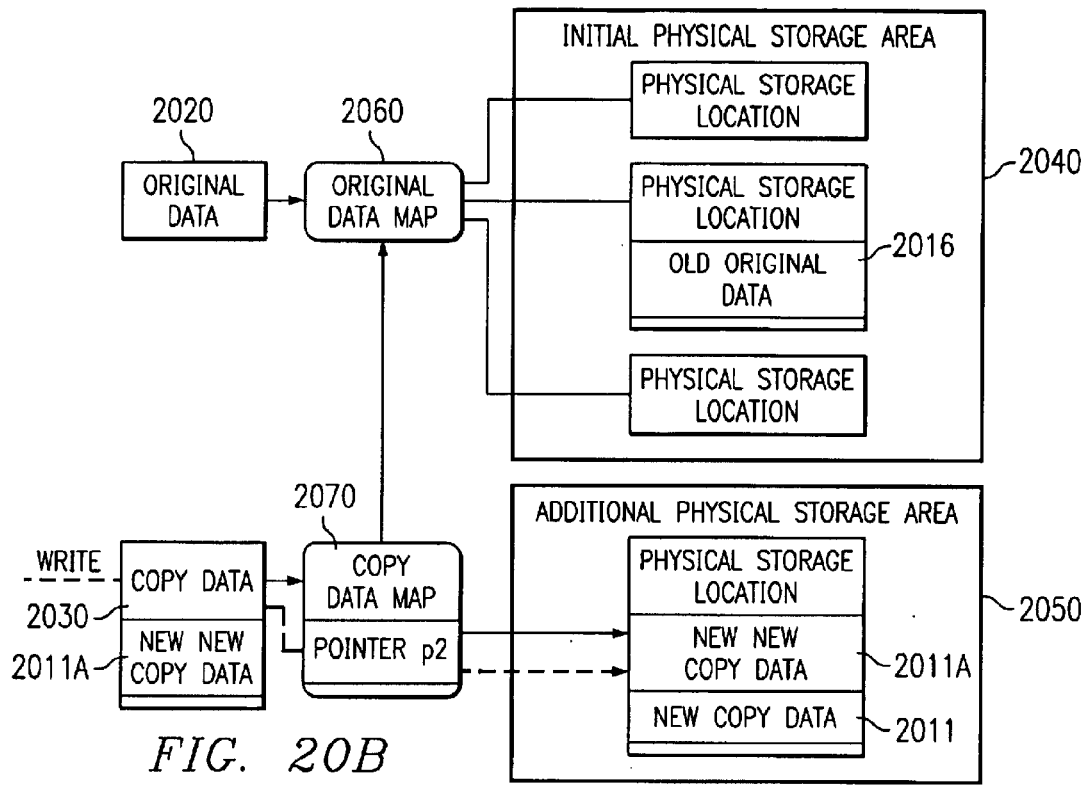
FIG. 20B is and exemplary diagram illustrating a subsequent write to the same copy data location illustrated in FIG. 20A.

As is shown in FIG. 20B, a subsequent write of new new copy data 2011A to the same copy data 2030 location (or to the new original data 1910 in FIG. 19) will result in no additional copy activity. The new data (copy or original) will be replaced by the new data and the pointer P1 updated to pointer P2 that points to the new new data.

With reference again to FIG. 19, the above write operations may occur in combination with regard to the same original data 1920 and copy data 1930. That is, a first write operation may occur to the original data area 1920, thereby causing the old data in the original data 1920 to be copied to the additional physical storage area 1950. The original pointer now references the new original data in the initial physical storage area 1940 and a new pointer P1 is generated to point to the old data in the additional physical storage area 1950. A second write operation 2011A may occur to the copy data 1930, which does not require that the old copy data 1915 in the additional physical storage area 1950 be copied. A new pointer P2 need only be generated in the meta-data to point to the new new copy data 2011A in the additional physical storage area 1950.

As mentioned above, each data map which constitutes the meta-data contains a pointer table having pointers for data in each of the original data and the copy data. The meta-data further includes information in correlation with the pointers in the pointer table indicating whether the pointers point to new or old data. The correlation information can be explicit as in setting new and old flags or can be implicit as in putting the pointers into a structure that identifies old from new.

Figure 21:
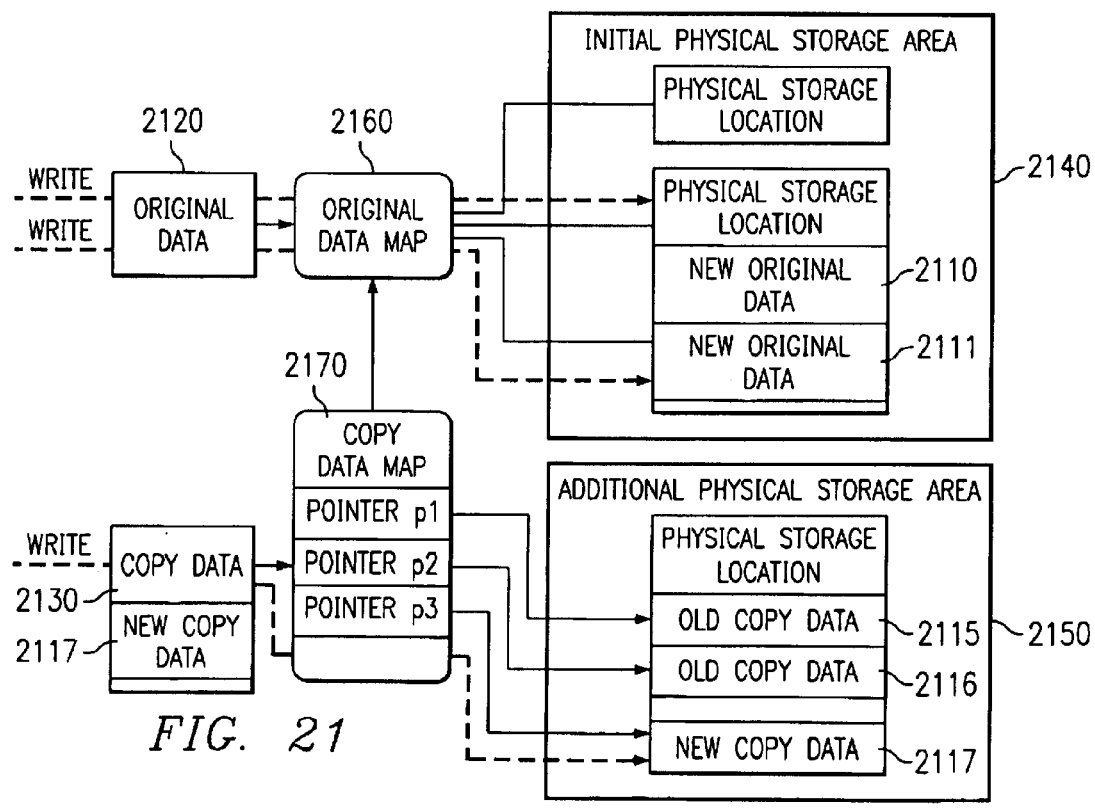
FIG. 21 is an exemplary diagram illustrating how the copy operations described with regard to FIGS. 19 and 20A–B may be used with variable size mapping units.

FIG. 21 is an exemplary diagram illustrating how the copy operations described above with regard to FIGS. 19 and 20 may be used with variable size mapping units. As shown in FIG. 21, the original data 2120 has had two sections of data overwritten by new original data 2110 and 2111. As a consequence, the old copy data 2115 and 2116 that was in these two sections has been copied to the additional physical storage area 2150. Furthermore, new pointers P1 and P2 were generated in the pointer table of the metadata to reference the old copy data 2115 and 2116 that was copied to the additional physical storage area 2150.

In addition, one section of data in the copy data 2130 has been overwritten by new copy data 2117. As with the copy procedure described above in FIG. 19, the original data in the section overwritten need not be copied to the additional physical storage area 2150. Thus, only a new pointer P3 is generated in the pointer table to point to the new data in the additional physical storage area 2150.

The sections of old and new data may have variable size. For example, old copy data 2116 may be of a different size than new copy data 2117. Thus, it is important to keep track in the meta-data of the size of each section of data pointed to by the pointers in the pointer table. Accordingly, the meta-data stores a data section size in association with the pointers in the pointer table. In this way, any processor that makes use of the data stored in the original physical storage area 2140 and/or additional physical storage area 2150 will be aware of the extent of the data sections.

While the above copy methods provide a very efficient mechanism for copying data mapped using load point and offset, the amount of copying may be such that the above method is not the most efficient method for performing the instant copy operation. That is, even with the above method, it would be beneficial to reduce the number of actual copy operations required to generate the original data and copy data copies of the data. Therefore, it would be beneficial to have an instant copy method by which copying of data may be performed with minimal actual copying of the data.

Figure 22:
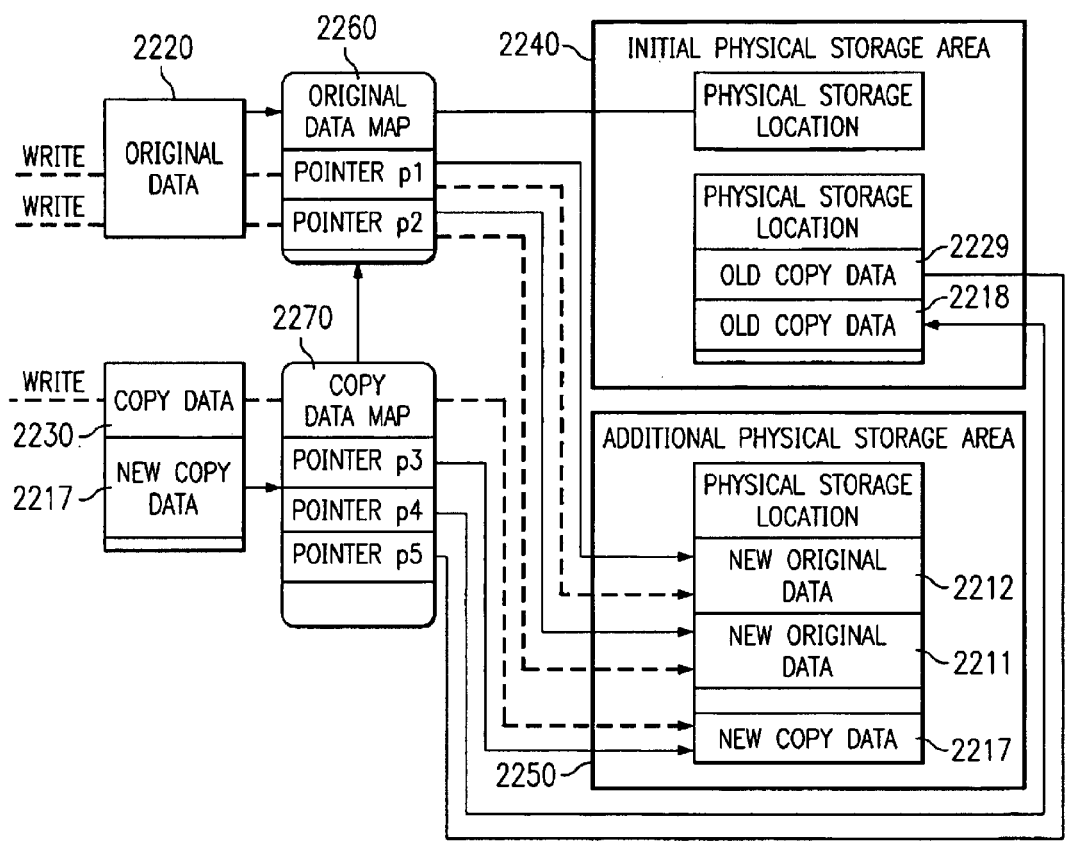
FIG. 22 is an exemplary diagram illustrating an instant copy method, i.e. method A2, in which all writes are made to the copy data area.

FIG. 22 is an exemplary diagram illustrating an instant copy method, i.e. method A2, in which all writes are made to the additional physical storage area 2250. With this method, whenever a write operation is to be made to either the original data 2220 or the copy data 2230, the write operation is only made to the additional physical storage area 2250. Thus, as shown in FIG. 22 new original data 2211–2212 to be written to the original data 2220 is actually written to the additional physical storage area 2250. Similarly, new copy data 2217 that is to be written to the copy data 2230 is also written to the additional physical storage area 2250. Thus, the additional physical storage area is a combination of new data for the original data 2220 and new data for the copy data 2230.

As with the copy methods described in FIGS. 18–21, new pointers p1–p5 are generated in the data maps to point to the new data for the original data 2220 and the new data for the copy data 2230. With this copy method, however, pointers p1–p2 that point to the new data for the original data 2220 are linked to one another and pointers to the new and old data for the copy data 2230 may also be linked to one another. In this way, as will be described hereafter, the two copies of data, i.e. the original data and the copy data may be separated to generate the two separate copies.

Figure 23:
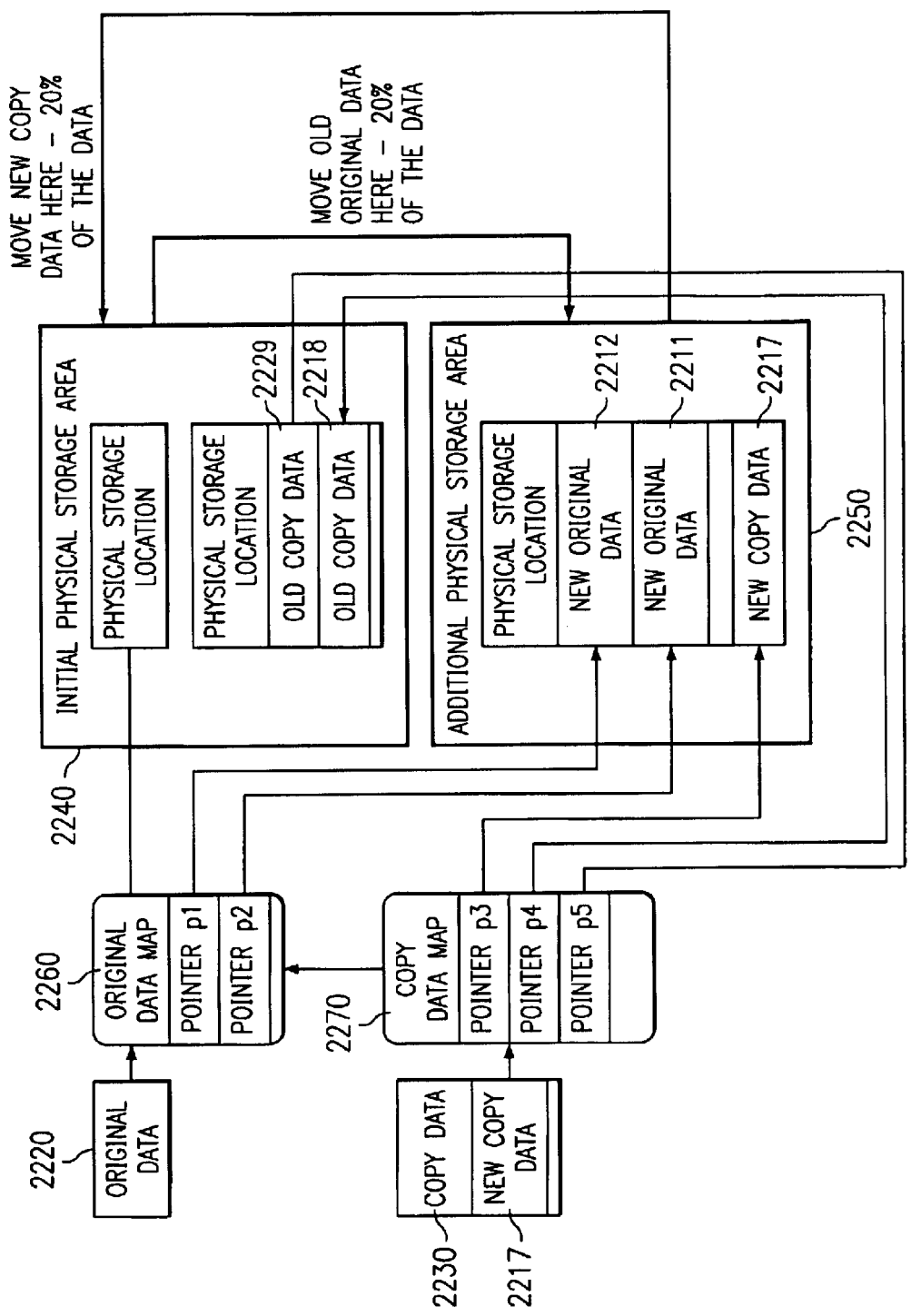
FIG. 23 illustrates a separation of two copies of data in accordance with the present invention.

As shown in FIG. 23, in order to separate the two copies of data, i.e. the original data and the copy data, a determination is made as to how much new original data is present in the additional physical storage area and how much copy data is present in the additional physical storage area. This determination may be made based on the information stored in the meta-data that keeps track of which pointers point to new data for the original data, which pointers point to new data for the copy data, and which pointers point to old data. The copy that has the most new data in the additional physical storage area 2250 will remain in the additional physical storage area 2250 while the other copy will be moved to the initial physical storage area 2240. The old data that is in the initial physical storage area 2240 that is related to the new data that is to remain in the additional physical storage area 2250 will also be moved to the additional physical storage area 2250.

For example, assume that the additional physical storage area contains 80% new data for the original data and 20% new data for the copy data. Since moving the new data for the copy data results in less actual copying of data, the new data for the copy data will be copied, i.e. moved, to the initial physical storage area and the remaining old data in the original data is copied to the additional physical storage area. Thus, the initial physical storage area contains 20% new data for the copy data and 80% old data. The additional physical storage area contains 80% new data for the original data and 20% old data. As a result, the copy data and the original data are in the opposite locations to what is normally expected.

Figure 24A:
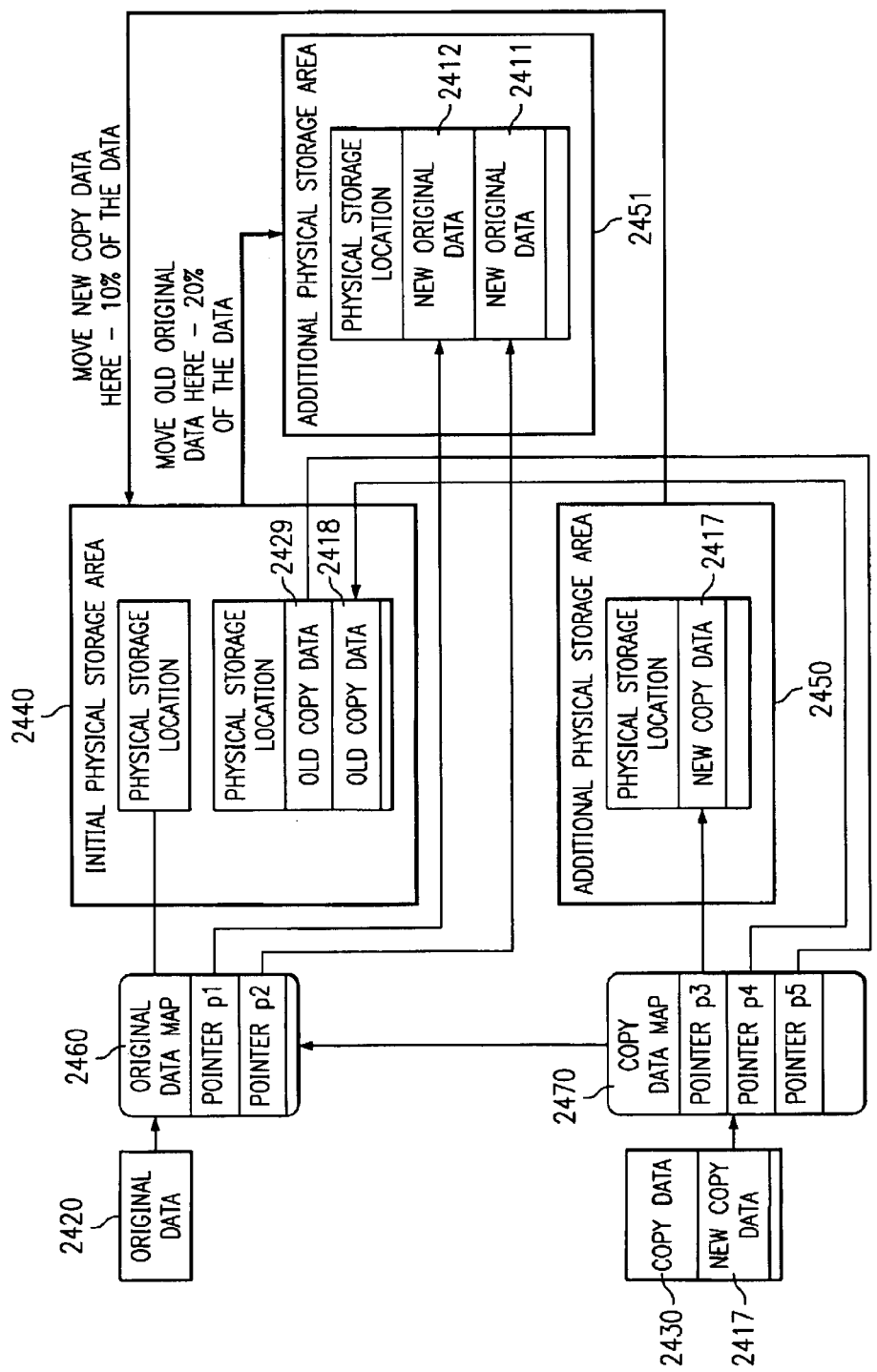
FIG. 24A illustrates how the present invention may be extended to multiple copy areas.

This instant copy method can be extended to multiple copy areas, as shown in FIG. 24A. The instant copy method, method A3, shown in FIG. 24A illustrates how three virtual volume areas may be used to perform an instant copy. In this example, all new data to be written to the original data is written to a first additional physical storage area 2451 rather than the initial physical storage area 2440. All new data to be written to the copy data is written to the second additional physical storage area 2450. In the particular example shown in FIG. 24A, as a result of the above write methodology, the original data 2420 contains 80% new data and the copy data 2430 contains 10% new data, the first additional physical storage area 2451 contains 80% new original data, and the second additional physical storage area 2450 contains the 10% new copy data.

Figure 24B:
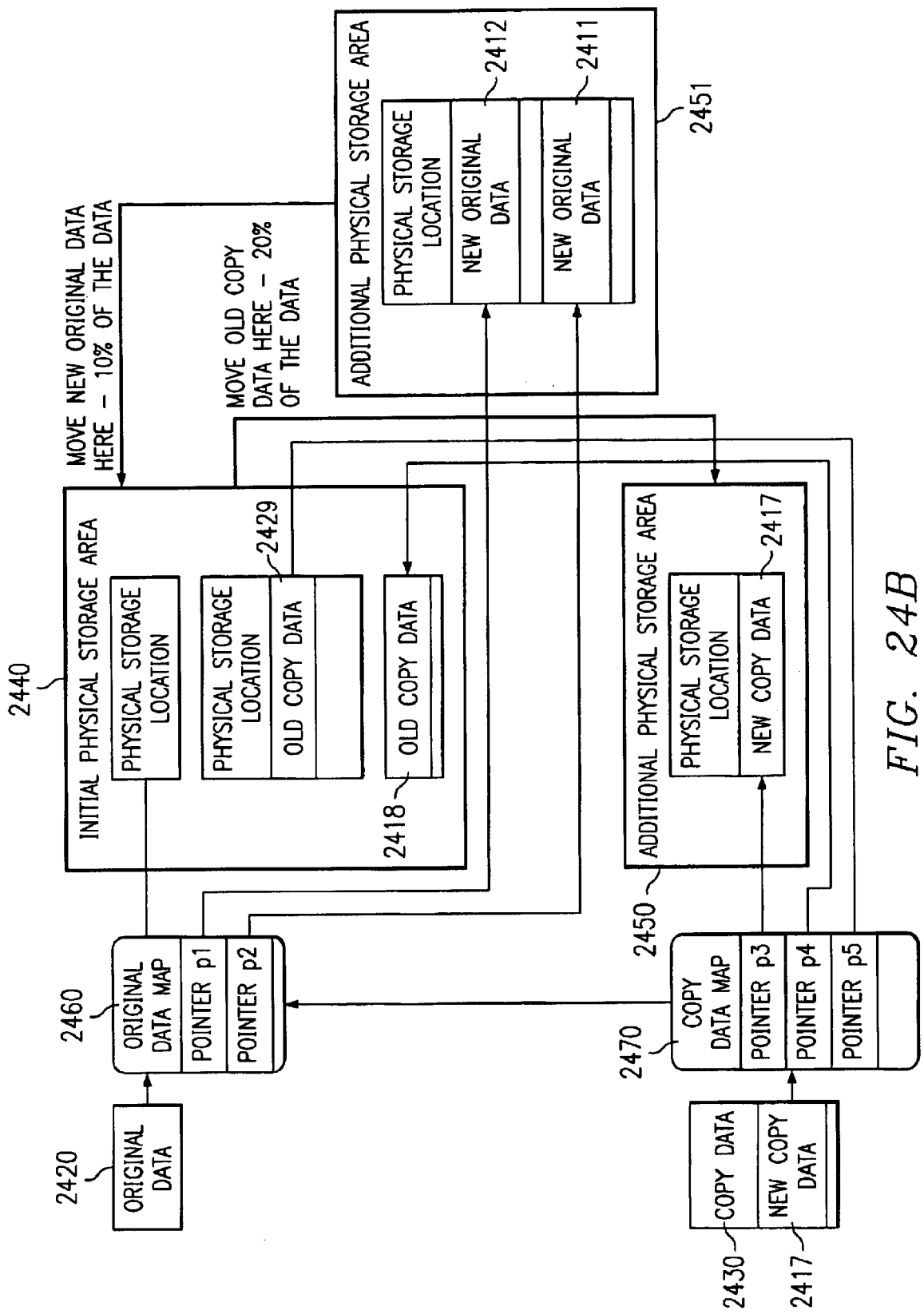
FIGS. 24B and 24C, show how the same operation as in FIG. 24A may be performed for various amounts of new data in each of the two copy areas.
Figure 24C:
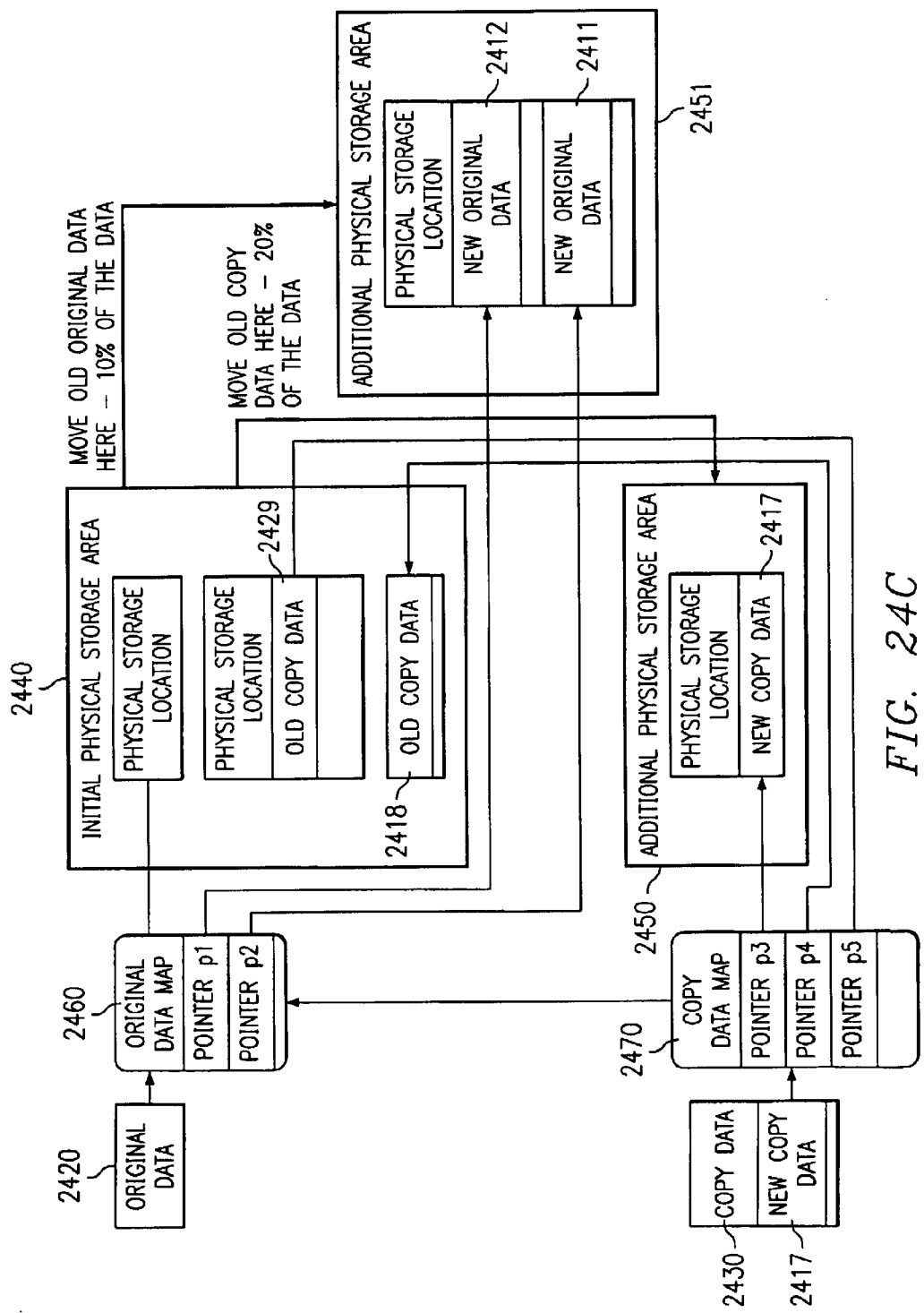

When it becomes necessary to separate the various copies of data, the same movement methodology described above is used with the three data areas. That is, since the first additional physical storage area 2451 contains 80% new data for the original data, the old data is moved to the first additional physical storage area 2451. Since the second additional physical storage area 2450 contains 10% new data, this new copy data 2417 is copied to the initial physical storage area 2440. As a result, the initial physical storage area 2440 contains copy data and the first additional physical storage area 2451 contains the original data. FIG. 24B shows how this same operation is performed for various amounts of new data in each of the two copy areas. This operation may further be expanded to embodiments using a copy method, method An, having more than two copy areas if so desired.

The mirror copy method that exists in the art today requires that a user of the storage system first establish mirror sets. When an instant copy is required, one of the mirrors in the set is removed from the set and no changes are allowed to that instance of data until it has been copied to another location. While the copy operation is proceeding, any writes to the rest of the original mirror set are noted (e.g., via a log or via bitmaps). After the copy operation is completed, the mirror is reestablished by restoring the copied data to the mirror and the noted writes are performed on the new addition to the mirror.

Figure 25A:
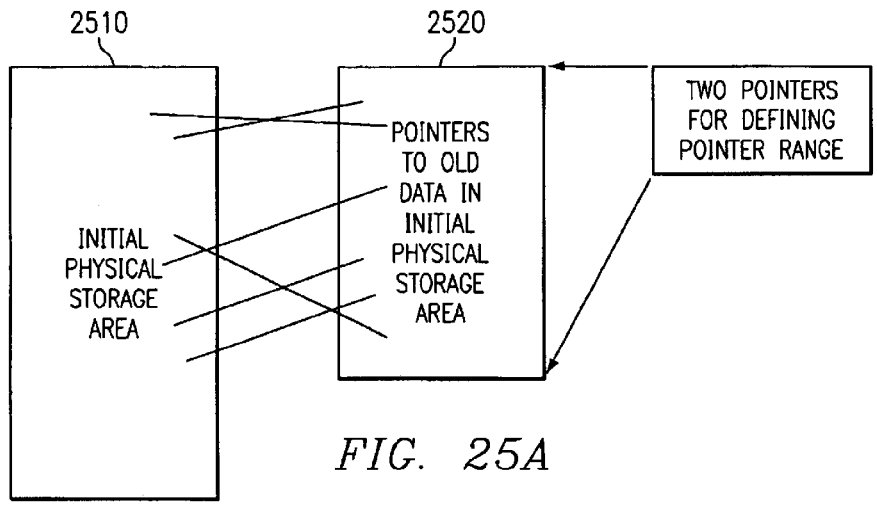
FIGS. 25A and 25B illustrate an instant copy method, method C, that may be used to copy data which was originally mapped using a full pointer system, such as log-structured file mapping.
Figure 25B:
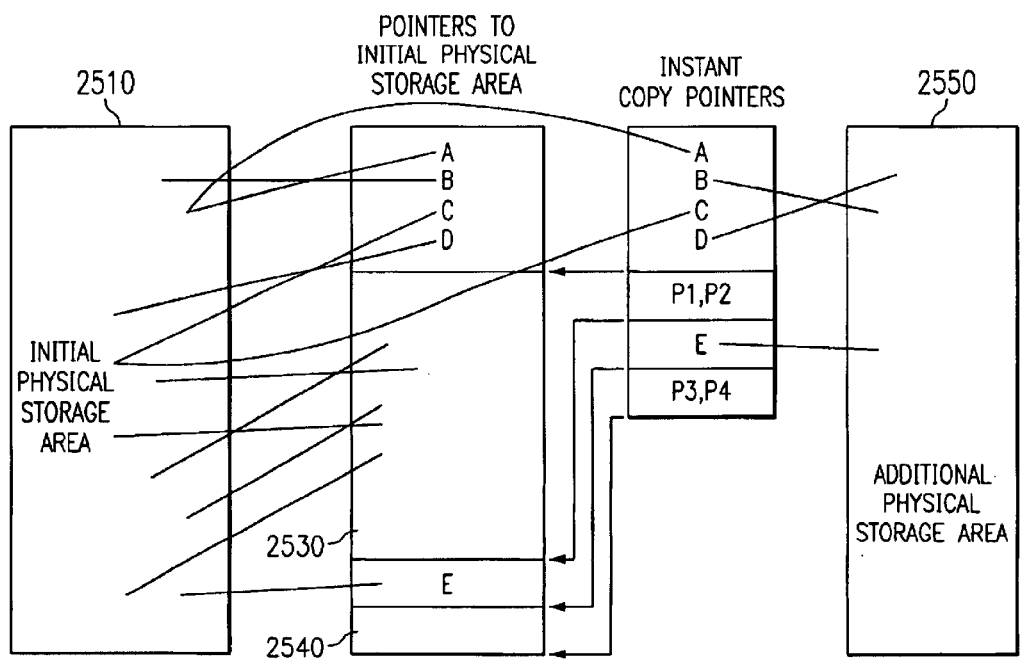

FIGS. 25A and 25B illustrate an instant copy method, method C, that may be used to copy data which was originally mapped using a full pointer system, such as log-structured file mapping. With this instant copy method, pointers to old data, i.e. data that has not been changed by a write operation, are referenced in the meta-data by a range of pointers, as will be described hereafter. By using such ranges of pointers, the amount of pointer information stored in the meta-data of the instant copy can be reduced.

Instant copy meta-data is that information needed to identify the original data extents that are to be copied and the copy data nomenclature that will identify the copy data and any controls related to the operation. Controls might be the timing of the operation such as "do this at midnight local time" or could be frequency "do this after every 1000 writes to the original data". Once a copy is initiated, pointers are created as necessary to map all of the original and the copy data either directly or indirectly. There is also storage meta-data that identifies individual instances of stored data and might indicate age, size, generation, expiration date, frequency of use, date of last use, etc. This meta-data is associated with the pointers that allow one to locate the data so it can be referenced with the data and updated as necessary. Data is copied only when there are requirements that two or more versions of an instance of data be maintained.

As shown in FIG. 25A, an initial physical storage area 2510 contains data that has not been changed by write operations. Original pointers 2520 to this original data are stored in the meta-data for the virtual volume stored in this initial physical storage area 2510. If an instant copy operation is performed, the original pointers 2520 to the original data in the old data space 2510 will be used in the meta-data of the instant copy. Thus, only two pointers are needed to identify an instant copy of data, i.e. a begin pointer and end pointer to the original data pointers to be used. Therefore, rather than having to copy all of the original pointers to the instant copy meta-data, these original pointers 2520 may be referenced by the instant copy meta-data as a range of pointers.

FIG. 25B shows an example of how the above pointer ranges may be used to reduce the size of the instant copy meta-data. As shown in FIG. 25B, pointers A, B, C, D and E all initially point to original data in the initial physical storage area 2510. At some time later, an instant copy operation is initiated and some of the data in the initial physical storage area has corresponding new data written to the additional physical storage area 2550. In particular, the data associated with pointers B, D and E have corresponding new data in the additional physical storage area 2550. As a consequence, the pointers in the instant copy meta-data comprise pointers A and C which point to original data in the initial physical storage area 2510 and pointers B, D and E point to new data in the additional physical storage area 2550. In addition, there are ranges of pointers with which no new data has been written. These ranges of pointer can be referenced in the instant copy meta-data by referencing simply the first and last pointers of the pointers to the original data.

Thus, for example, the range 2530 is identified in the instant copy meta-data as pointers P1 and P2 with an indication that these pointers refer to a range of pointers inclusively. Similarly, the range 2540 may be designated by the begin and end pointers P3 and P4. Thus, the size of the pointer table in the instant copy meta-data is reduced.

As shown in FIGS. 18–25B, the present invention provides various instant copy methods that may be used to perform an instant copy operation on data based on the mapping method originally used to store the data. The various instant copy methods provide varying levels of actual copying performed and amounts of meta-data that need to be maintained. Each method has its own advantages and disadvantages and thus, the use of each may be selected based on the particular application to which the present invention is placed. With all these instant copy methods, however, an efficient instant copy may be performed in view of the original mapping of the data to be copied.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a random access memory (RAM), compact disc read only memories (CD-ROMs), and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of performing an instant copy of data, comprising:

determining a mapping of the data;

determining an instant copy operation based on the mapping of the data; and performing an instant copy of the data using the instant copy operation.

2. The method of claim 1, wherein determining a mapping of the data includes parsing extents of the data into sets based on types of mapping used to map the extents.

3. The method of claim 2, wherein determining an instant copy operation based on the mapping of the data includes setting up an instant copy mechanism for each of the sets based on the type of mapping used to map the extents in each set.

4. The method of claim 1, wherein the mapping of the data is one of load point and offset and a full pointer mapping.

5. The method of claim 1, wherein the data is stored in a variable dynamically changeable mapping scheme storage area.

6. The method of claim 4, wherein performing an instant copy of the data using the instant copy operation includes using a full pointer table if the mapping of the data is a full pointer mapping.

7. The method of claim 4, wherein performing an instant copy of the data using the instant copy operation includes one of copying unchanged blocks of data from a source storage area to a new copy storage area and copying changed blocks of data from a source storage area to a new copy storage area.

8. The method of claim 2, further comprising generating copy meta-data based on the parsing of the extents of the data.

9. The method of claim 1, wherein the data is stored in an initial physical storage area, and wherein the instant copy operation includes copying a portion of the data from the initial physical storage area to an additional physical storage area in response to a data write to the location of the portion of data in the initial physical storage area.

10. The method of claim 9, wherein the instant copy operation further includes generating a pointer to a location, in the additional physical storage area, of the portion of data copied to the additional physical storage area.

11. The method of claim 1, wherein the data is stored in an initial physical storage area, and wherein if a data write occurs to a location of an additional physical storage area that is used to store copy data, the instant copy operation includes generating a pointer to the location in the additional physical storage area.

12. The method of claim 11, wherein if a data write occurs to the additional physical storage-area, the portion of data referenced by the data write is not copied from the initial physical storage area to the additional physical storage area.

13. The method of claim 10, wherein the pointer is generated in a pointer table of meta-data associated with the additional physical storage area.

14. The method of claim 11, wherein the pointer is generated in a pointer table of meta-data associated with the additional physical storage area.

15. The method of claim 9, further comprising writing a new portion of data to the location of the portion of data in the initial physical storage area, after copying the portion of data to the additional physical storage area.

16. The method of claim 10, wherein the portion of data has a size that is different with respect to other portions of data in the data.

17. The method of claim 16, further comprising storing the pointer and an associated size of the portion of data in a meta-data data structure.

18. The method of claim 1, wherein the data is stored in an initial physical storage area, and wherein if there is a data write to a location of a portion of the data in the initial physical storage area, the data write is performed on an additional physical storage area rather than the initial physical storage area.

19. The method of claim 18, wherein if there is a data write to a location of a portion of the data in additional physical storage area, the data write is performed on the additional physical storage area.

20. The method of claim 19, wherein the additional physical storage area contains a combination of new data for original data and new data for copy data.

21. The method of claim 20, further comprising generating pointers for new data written to the additional physical storage device by the data write.

22. The method of claim 21, wherein pointers to new data for original data are linked to one another and pointers to new data for copy data are linked to one another.

23. The method of claim 20, further comprising separating the original data from the copy data.

24. The method of claim 23, wherein separating the original data from the copy data includes determining a first amount of new data for the original data that is present in the additional physical storage device and a second amount of new data for the copy data that is present in the additional physical storage device.

25. The method of claim 24, further comprising comparing the first amount to the second amount and copying one of the new data for the original data and the new data for the copy data to the initial physical storage device based on the comparison.

26. The method of claim 25, wherein the new data for the original data is copied to the initial physical storage device if the first amount is less than the second amount.

27. The method of claim 25, wherein the new data for the copy data is copied to the initial physical storage device if the second amount is less than the first amount.

28. The method of claim 1, wherein performing an instant copy of the data using the instant copy operation includes using a pair of pointers representing a range of pointers to point to portions of the data that have not been changed by a data write operation.

29. The method of claim 28, wherein performing an instant copy of the data using the instant copy operation further includes using individual pointers to point to portions of data that have changed due to a data write operation.

30. The method of claim 29, wherein the pair of pointers and the individual pointers are stored in a pointer table associated with a physical storage area.

31. A computer program product in a computer readable medium for performing an instant copy of data, comprising:

first instructions for determining a mapping of the data;

second instructions for determining an instant copy operation based on the mapping of the data; and third instructions for performing an instant copy of the data using the instant copy operation.

32. The computer program product of claim 31, wherein the first instructions for determining a mapping of the data include instructions for parsing extents of the data into sets based on types of mapping used to map the extents.

33. The computer program product of claim 32, wherein the second instructions for determining an instant copy operation based on the mapping of the data include instructions for setting up an instant copy mechanism for each of the sets based on the type of mapping used to map the extents in each set.

34. The computer program product of claim 31, wherein the mapping of the data is one of load point and offset and a full pointer mapping.

35. The computer program product of claim 31, wherein the data is stored in a variable dynamically changeable mapping scheme storage area.

36. The computer program product of claim 34, wherein the third instructions for performing an instant copy of the data using the instant copy operation include instructions for using a full pointer table if the mapping of the data is a full pointer mapping.

37. The computer program product of claim 34, wherein the third instructions for performing an instant copy of the data using the instant copy operation include instructions for one of copying unchanged blocks of data from a source storage area to a new copy storage area and copying changed blocks of data from a source storage area to a new copy storage area.

38. The computer program product of claim 32, further comprising fourth instructions for generating copy metadata based on the parsing of the extents of the data.

39. The computer program product of claim 31, wherein the data is stored in an initial physical storage area, and wherein the third instructions include instructions for copying a portion of the data from the initial physical storage area to an additional physical storage area in response to a data write to the location of the portion of data in the initial physical storage area.

40. The computer program product of claim 39, wherein the third instructions further include instructions for generating a pointer to a location, in the additional physical storage area, of the portion of data copied to the additional physical storage area.

41. The computer program product of claim 31, wherein the data is stored in an initial physical storage area, and wherein the third instructions include instructions for generating a pointer to a location in an additional physical storage area that is used to store copy data, if a data write occurs to the location of the additional physical storage area.

42. The computer program product of claim 41, wherein if a data write occurs to the additional physical storage area, the portion of data referenced by the data write is not copied from the initial physical storage area to the additional physical storage area.

43. The computer program product of claim 40, wherein the pointer is generated in a pointer table of meta-data associated with the additional physical storage area.

44. The computer program product of claim 41, wherein the pointer is generated in a pointer table of meta-data associated with the additional physical storage area.

45. The computer program product of claim 39, further comprising fourth instructions for writing a new portion of data to the location of the portion of data in the initial physical storage area, after copying the portion of data to the additional physical storage area.

46. The computer program product of claim 40, wherein the portion of data has a size that is different with respect to other portions of data in the data.

47. The computer program product of claim 46, further comprising fourth instructions for storing the pointer and an associated size of the portion of data in a meta-data data structure.

48. The computer program product of claim 31, wherein the data is stored in an initial physical storage area, and wherein if there is a data write to a location of a portion of the data in the initial physical storage area, the data write is performed on an additional physical storage area rather than the initial physical storage area.

49. The computer program product of claim 48, wherein if there is a data write to a location of a portion of the data in additional physical storage area, the data write is performed on the additional physical storage area.

50. The computer program product of claim 49, wherein the additional physical storage area contains a combination of new data for original data and new data for copy data.

51. The computer program product of claim 50, further comprising fourth instructions for generating pointers for new data written to the additional physical storage device by the data write.

52. The computer program product of claim 51, wherein pointers to new data for original data are linked to one another and pointers to new data for copy data are linked to one another.

53. The computer program product of claim 50, further comprising fourth instructions for separating the original data from the copy data.

54. The computer program product of claim 53, wherein the fourth instructions for separating the original data from the copy data includes instructions for determining a first amount of new data for the original data that is present in the additional physical storage device and instructions for determining a second amount of new data for the copy data that is present in the additional physical storage device.

55. The computer program product of claim 54, further comprising instructions for comparing the first amount to the second amount and instructions for copying one of the new data for the original data and the new data for the copy data to the initial physical storage device based on the comparison.

56. The computer program product of claim 55, wherein the new data for the original data is copied to the initial physical storage device if the first amount is less than the second amount.

57. The computer program product of claim 55, wherein the new data for the copy data is copied to the initial physical storage device if the second amount is less than the first amount.

58. The computer program product of claim 31, wherein the third instructions for performing an instant copy of the data using the instant copy operation include instructions for using a pair of pointers representing a range of pointers to point to portions of the data that have not been changed by a data write operation.

59. The computer program product of claim 58, wherein the third instructions for performing an instant copy of the data using the instant copy operation further include instructions for using individual pointers to point to portions of data that have changed due to a data write operation.

60. The computer program product of claim 59, wherein the pair of pointers and the individual pointers are stored in a pointer table associated with a physical storage area.

61. An apparatus for performing an instant copy of data, comprising:

means for determining a mapping of the data;

means for determining an instant copy operation based on the mapping of the data; and means for performing an instant copy of the data using the instant copy operation.

* * * * *